US006424351B1

(12) United States Patent
Bishop et al.

(10) Patent No.: US 6,424,351 B1
(45) Date of Patent: Jul. 23, 2002

(54) METHODS AND SYSTEMS FOR PRODUCING THREE-DIMENSIONAL IMAGES USING RELIEF TEXTURES

(75) Inventors: Thomas G. Bishop, Apex; Manuel M. de Oliveira Neto, Chapel Hill, both of NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/295,839

(22) Filed: Apr. 21, 1999

(51) Int. Cl.[7] .......................... G06T 11/40; G06T 15/20
(52) U.S. Cl. ...................................... 345/582; 345/427
(58) Field of Search ................................ 345/427, 430, 345/425, 582

(56) References Cited

U.S. PATENT DOCUMENTS

| 5,204,944 A | | 4/1993 | Wolberg et al. |
| 5,841,441 A | | 11/1998 | Smith |
| 5,963,664 A | * | 10/1999 | Kumar et al. ................ 382/154 |
| 6,192,145 B1 | * | 2/2001 | Anandan et al. ............. 382/154 |
| 6,215,496 B1 | * | 4/2001 | Szeliski et al. .............. 345/419 |

OTHER PUBLICATIONS

Shade et al., "Layered Depth Images", Proc. SIGGRAPH 98, pp. 231–242, (Jul. 19–24, 1998).
Schaufler, "Nailboards: A Rendering Primitive for Image Caching in Dynamic Scenes", Proc. pf 8th Eurographics Workshop on Rendering, pp. 151–162, (Jun. 16–18, 1997).
Catmull et al., "3–D Transformation of Images in Scanline Order", Proc. SIGGRAPH 80, pp. 279–285, (Jul. 14–18, 1980).
Smith, "Planar 2–Pass Texture Mapping and Warping", vol. 21, No. 4, Computer Graphics, pp. 263–272, (Jul., 1987).
Fant, "A Nonaliasing, Real–time Spatial Transform Technique", vol. 6, No. 1, IEEE Computer Graphics and Applications, pp. 71–80, (Jan., 1986).
Robertson, "Fast Perspective Views of Images Using One–dimensional Operations", IEEE Computer Graphics and Applications, pp. 47–56, (Feb., 1987).
Mark et al., "Memory Access Patterns of Occlusion–compatible 3–D Image Warping", Proceedings of 1997 SIGGRAPH/Eurographics Workshop on Graphics Hardware, pp. 34–44, (Aug. 3–4, 1997).
Mark et al., "Efficient Reconstruction Techniques for Post–rendering 3D Image Warping", University of North Carolina at Chapel Hill, UNC Computer Science Technical Report TR98–011, pp. 1–12, (Mar. 21, 1999).
Toffoli et al., "Three–dimensional Rotations by Three Shears", vol. 59, No. 2, Graphical Models and Image Processing, pp. 89–95, (Mar., 1997).
Sueyllam et al., "A Parallel One Dimensional Resampling Algorithm", IEEE Symposium on Computers and Communications, pp. 277–281, (1995).

(List continued on next page.)

*Primary Examiner*—Jeffery Brier
*Assistant Examiner*—Ryan Yang
(74) *Attorney, Agent, or Firm*—Jenkins & Wilson, P.A.

(57) ABSTRACT

Methods and systems for producing three-dimensional images of a scene using relief textures include modeling surfaces in a scene with one or more relief textures. Each relief texture is projected onto its basis plane based on a desired viewpoint to produce a pre-warped image. Each pre-warped image is projected onto one or more polygons used to model the scene. Because the steps of texture mapping and pre-warping are separated, solving for visibility during the pre-warping is facilitated by using one-dimensional pre-warping equations

12 Claims, 31 Drawing Sheets

(12 of 31 Drawing Sheet(s) Filed in Color)

OTHER PUBLICATIONS

Fleury et al., "Sampling Concerns in Scanline Algorithms", vol. 16, No. 3, IEEE Transactions on Medical Imaging, pp. 349–361, (Jun., 1997).

Breene et al., "Image Warping by Scanline Operations", vol. 17, No. 2, Computer and Graphics, pp. 127–130, (1993).

Wolberg et al., "Separable Image Warping with Spatial Lookup Tables", vol. 23, No.3, Computer Graphics, pp. 369–378, (Jul., 1989).

Williams, "Pyramidal Parametrics", vol. 7, No. 3, Computer Graphics, pp. 1–11, (Jul., 1983).

Heckbert, "Survey of Texture Mapping", vol. 6, No. 11, IEEE Computer Graphics and Applications, pp. 56–67, (Nov., 1986).

Mark et al., "Post–rendering 3D Warping", Proceedings of 1997 Symposium on Interactive 3D Graphics, pp. 7–16, (Apr. 27–30, 1997).

McMillan et al., "Plenoptic Modeling: An Image–based Rendering System", Proceedings of SIGGRAPH 95, pp. 1–8, (Aug. 6–11, 1995).

Dally et al., "The Delta Tree: An Object–centered Approach to Image–based Rendering", MIT AI Lab, Technical Memo 1604, Massachusetts Institute of Technology, pp. 1–12, (May, 1996).

Smith, "Projected Superquadratics are 2–Pass Transformable", Technical Memo 54, Lucasfilms Ltd., pp. 1–5, (Aug. 222, 1982).

McMillan et al., "Shape as a Perturbation to a Projective Mapping", University of North Carolina at Chapel Hill, UNC Technical Report TR95, pp. 1–10, (Apr., 1995).

McMillan, "A List–priority Rendering Algorithm for Redisplaying Projected Surfaces", University of North Carolina at Chapel Hill, UNC Technical Report 95–005, pp. 1–10, (1995).

Smith, "A 2–Pass Solution to the Planar Biquadratic Patch", Computer Graphics Department Lucasfilm/PIXAR, Technical Memo 128, pp. 1–8, (May 1, 1985).

Smith, "A 2–Pass Solution to the Planar Bicubic Patch", Computer Graphics Lucasfilm/PIXAR, Technical Memo 132, pp. 1–12, (Jun. 1, 1985).

Smith, "Serial vs. Parallel Warps", Computer Graphics Department Lucasfilm/PIXAR, Technical Memo 134, pp. 1–4, (Jun. 21, 1985).

McMillan, "Computing Visibility Without Depth", University of North Carolina at Chapel Hill, UNC Computer Science Technical Report TR95–047, pp. 1–22, (Oct., 1995).

Oliviera et al., "Relief Textures", University of North Carolina at Chapel Hill, UNC Technical Report TR99–015, pp. 1–25, (Apr. 22, 1999).

Schaufler, "Per–Object Image Warping with Layered Imposters" Proceedings of the 9th Eurographics Workshop on Rendering, pp. 145–156, (Jun., 1998).

Meyer et al., "Interactive Volumetric Textures", Proceedings of the 9th Eurographics Workshop on Rendering, pp. 157–168, (Jun., 1998).

Levoy et al., "Light Field Rendering", SIGGRAPH 96, pp. 1–12, (1996).

Grossman et al., "Point Sample Rendering", Proceedings of the 9th Eurographics Workshop on Rendering, pp. 181–192, (Jun., 1996).

Gortler et al., "The Lumigraph", Proc. SIGGRAPH 96, pp. 43–54, (Aug. 4–9, 1996).

Debevec et al., "Modeling and Rendering Architecture from Photographs: A Hybrid Geometry–and Image–based Approach", SIGGRAPH Conference Proceedings, pp. 1–10, (1996).

Debevec et al., "Efficient View–dependent Image–based Rendering with Projective Texture–mapping", Proceedings of the 9th Eurographics Workshop on Rendering, pp. 105–116, (Jun., 1998).

Cohen et al., "Appearance–preserving Simplification", Proc. SIGGRAPH 98, pp. 279–285, (Jul. 19–24, 1998).

McMillan et al., "Shape as a Perturbation to Projective Mapping", University of North Carolina at Chapel Hill, UNC Technical Report TR95–046, pp. 1–10, (Apr., 1995).

Oliveira et al., "Image–based Objects", Proceedings of 1999 ACM Symposium on 3D Graphics, pp. 191–198, (Apr., 1999).

McMillan, "Computing Visibility Without Depth", University of North Carolina at Chapel Hill, UNC Computer Science Technical Report TR95–047, pp. 1–22, (Oct., 1995).

Paeth, "A Fast Algorithm for General Raster Rotation", Proceedings of Graphic Interface '86, pp. 179–191, (May, 1986).

Heckbert, "Fundamentals of Texture Mapping and Image Warping", Master's Thesis, Department of Electrical Engineering and Computer Science, University of California, Berkeley, pp. 1–65, (Jun. 17, 1999).

McMillan, Jr., "An Image–based Approach to Three–dimensional Computer Graphics", Ph.D. Dissertation, Department of Computer Science, University of North Carolina at Chapel Hill, pp. i–xv, 1–191, (1997).

* cited by examiner

FIG. 7
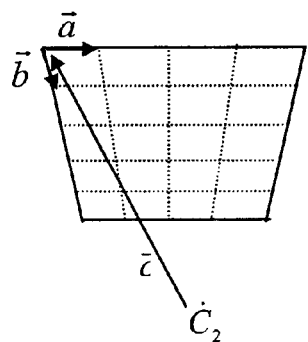
FIG. 8
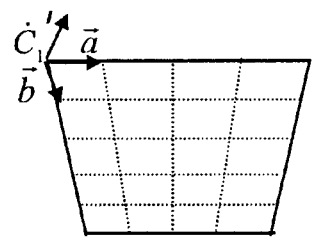
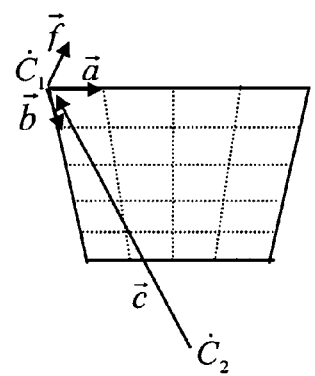
FIG. 9

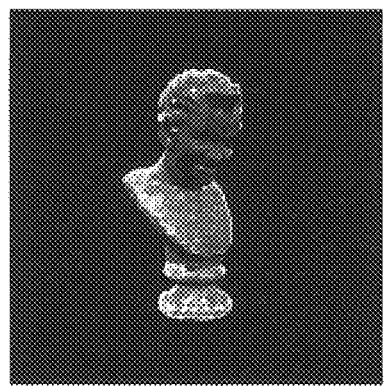
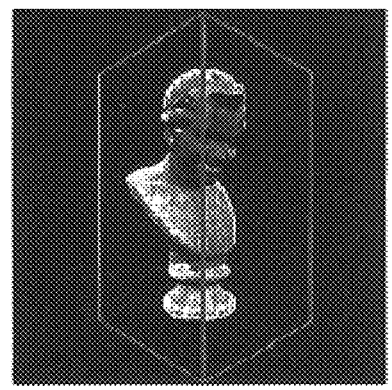
FIG. 22(a)    FIG. 22(b)
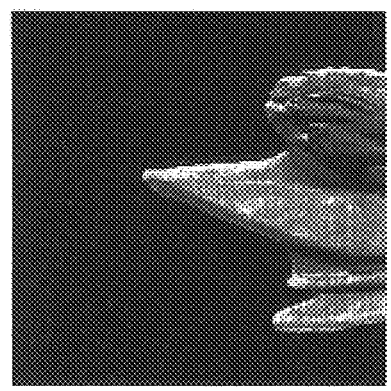
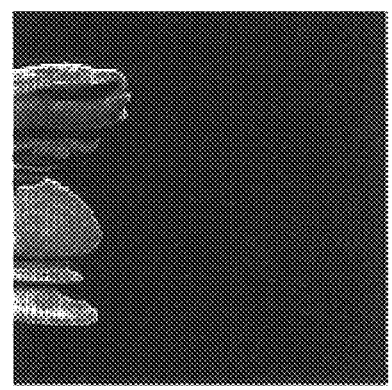
FIG. 23(a)    FIG. 23(b)

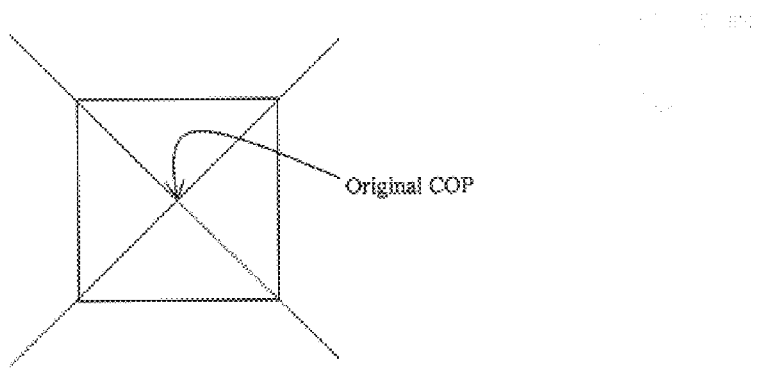
FIG. 31
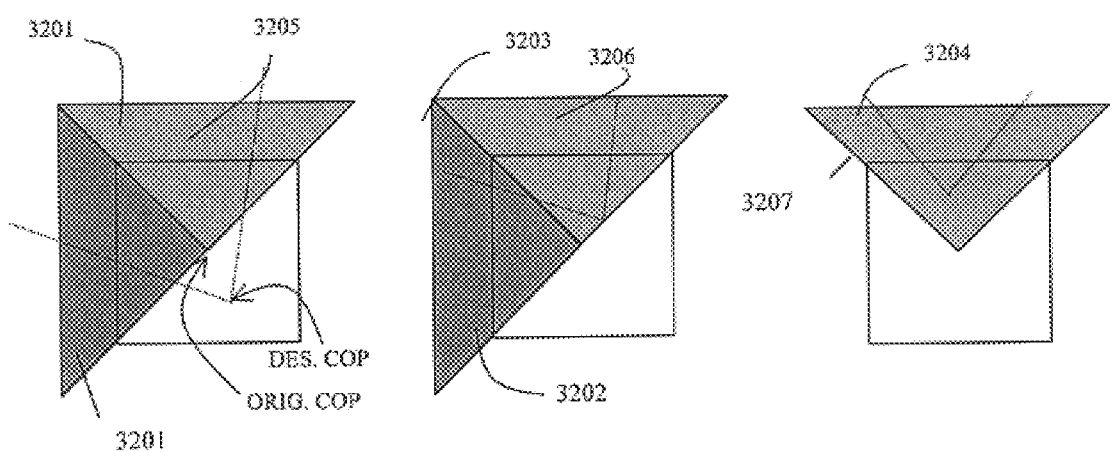
FIG. 32(a)  FIG. 32(b)  FIG. 32(c)

METHODS AND SYSTEMS FOR PRODUCING THREE-DIMENSIONAL IMAGES USING RELIEF TEXTURES

GOVERNMENT INTEREST

This invention was made with government support under Defense Advanced Research Projects Agency order number E278, National Science Foundation grant number MIP-961, and grant number 200054/95 from the Brazilian Research Council (CNPq). The Government has certain rights to this invention.

TECHNICAL FIELD

The present invention relates to methods and systems for producing three-dimensional images of a scene. More particularly, the present invention relates to modeling a scene using relief textures, pre-warping the relief textures into two-dimensional textures that are perspectively correct from a desired viewpoint, and texture mapping the two-dimensional textures to polygons used to model the scene.

RELATED ART

In computer graphics, conventional textures are two-dimensional patterns or arrays of pixels used to add detail to computer-generated images. In other words, each pixel in a conventional texture has a row coordinate in texture space, a column coordinate in texture space, and a color value. Texture mapping is the process of mapping two-dimensional textures onto polygons used to model objects displayed on a computer screen. For example, the front of a building may be represented by a rectangle in computer graphics. A texture for the front of the building may include the windows. Texture mapping is utilized to map the pixels in the texture from texture space to screen space. The most common form of texture mapping is inverse mapping. In inverse mapping, the color of each pixel in the rectangle is determined projecting the footprint of each pixel in screen space to texture space and integrating the pixel colors in the texture that fall within the footprint.

One problem with conventional texture mapping is that images created using conventional methods appear flat when viewed from different viewpoints. FIG. 1 illustrates computer images of a photograph viewed from different viewpoints. In FIG. 1, a first image 100 is a photograph shown from a viewpoint orthogonal to the plane of the page. A second image 106 is the same photograph shown from a viewpoint below the viewpoint of the image 100. In images 104 and 102, the photograph is shown from viewpoints shifted to the left and right of the viewpoint of the image 100. Because the photograph is flat, and the corresponding image is flat, occluded objects in the photograph cannot be seen when the viewpoint changes. For example, additional features of the person in the photograph do not become visible when the viewpoint changes. If, however, the actual scene is viewed, different things could be seen from the different viewpoints. For example, if the actual scene were viewed from the viewpoints of the images 104 and 102, left and right side views of the profiles of the person in the scene would be visible.

In computer graphics, the images of the photograph in FIG. 1 are the same as conventional textures, i.e., each image is a set of pixels, each having a row coordinate, a column coordinate, and a color value. The mapping of the images in FIG. 1 onto different viewing planes illustrates the limitations of conventional texture mapping. Thus, like the images of the photograph in FIG. 1, surfaces represented by two-dimensional textures appear flat when the viewpoint changes. FIG. 2 is an example of a scene represented with three polygons using conventional texture mapping. The red lines represent the borders of the polygons. Textures 200, 202, and 204 are mapped to the polygons and represent faces of buildings from the original scene. Because the textures do not convey depth information with regard to the actual surfaces they represent, the reproduction of the scene appears flat.

FIG. 3 illustrates conventional texture mapping in the one-dimensional domain. In FIG. 3, a first image 300 may represent a horizontal section through a two-dimensional texture. A second image 302 is a projection of the image 300 onto a projection plane 304. A third image 306 is a projection of the image 300 onto a projection plane 308. A fourth image 310 is a projection of the first image onto a projection plane 312. Because of the viewing angles between the original image and the projection planes 308 and 312, non-uniform contraction of the original image may occur. For example, in FIG. 3, the original image includes a red area 314, a green area 316, and a blue area 318. In the image 310, the red area 314 maps to red area 320. The green area 316 maps to green area 322, and the blue area 318 maps to blue area 324. Because of the viewing angle, the contraction of the red area between images 300 and 310 is greater than the contraction of the blue area. Despite the non-uniform contraction of the projected image, there is a one-to-one mapping between points of the original image 300 and points of the projected image 310. Because the mapping from original to projected images is one-to-one, the mapping can be easily inverted, i.e., given coordinates on the projected image, the computation of the corresponding coordinates on the original image is straightforward. When the projection plane is a computer screen and the original image is a texture image, this mapping is referred to as texture mapping. When pixels are mapped from the texture coordinates to the screen coordinates, the mapping is referred to as a forward mapping. When pixels are mapped from screen coordinates back to texture coordinates, the mapping is referred to as an inverse mapping. Because there is a one-to-one correspondence between pixels in the original and projected images in texture mapping, inverse mapping requires only simple calculations. The simple nature of the inverse formulation of texture mapping is known, presents several filtering advantages over the forward mapping, and is a standard operation in most computer graphics hardware.

Texture Mapping and Three-Dimensional Image Warping

Three-dimensional image warping is a mapping from a sampled three-dimensional model of a scene to a two-dimensional image from a given viewpoint. Texture mapping is a special case of three-dimensional image warping for which the input image is planar, as in the examples illustrated in FIGS. 1 and 2. Thus, for conventional two-dimensional images, both techniques produce exactly the same results. The difference between texture mapping and three-dimensional image warping is primarily in the type of input images, rather than the process, as will be explained in more detail below. Because conventional texture mapping only handles planar images, its equations are simpler than those used for three-dimensional image warping. Equations (1)–(4) shown below illustrate the relationship between texture mapping and three-dimensional image warping. Equations (1) and (2) define forward texture mapping; whereas, equations (3) and (4) define forward three-dimensional image warping. Each of the equations express how elements (pixels) of the input image represented by the coordinates ($u_1$, $v_1$) are mapped to elements of the projected image represented by the coordinates ($u_2$, $v_2$). In Equations (3) and (4), $displ(u_1, v_1)$ represents the height of each pixel in an image measured from a basis plane of the image. If $displ(u_1, v_1)$ is constant for all elements of the input image (i.e., the image is planar), equations (3) and (4) reduce to an instance of equations (1) and (2), respectively.

$$u_2 = \frac{Au_1 + Bv_1 + C}{Iu_1 + Jv_1 + K} \quad (1)$$

$$v_2 = \frac{Eu_1 + Fv_1 + G}{Iu_1 + Jv_1 + K} \quad (2)$$

$$u_2 = \frac{Au_1 + Bv_1 + C + Ddispl(u_1, v_1)}{Iu_1 + Jv_1 + K + Ldispl(u_1, v_1)} \quad (3)$$

$$v_2 = \frac{Eu_1 + Fv_1 + G + Hdispl(u_1, v_1)}{Iu_1 + Jv_1 + K + Ldispl(u_1, v_1)} \quad (4)$$

Images with Depth

Images with depth are images in which each pixel has an associated depth value representing a distance between the sample and the center of projection of a real or imaginary camera used to define the image. Images can be spherical, cylindrical, etc., but such images are not within the type of images referred to herein as non-planar images or images with depth. Due to the two-dimensional nature of the film and paper used to acquire and print pictures, images are commonly thought of as two-dimensional entities. In fact, an image is a mapping from a two-dimensional support to a multidimensional space. Such space is usually a color space (multiple wavelengths), but the space may contain information in addition to color. For instance, the space used to represent an image may contain depth information representing the distance of objects in the scene from the camera center of projection on a per element basis. For a real scene, the depth information may be collected using a depth-measuring device, such as a laser range finder. Computer images in which each element or pixel has an associated depth value, in addition to a color value, are referred to as images with depth. In a computer, an image with depth may be represented by a multidimensional array of numbers. Since computers are capable of easily manipulating arrays of numbers, from a computer's point-of-view, an image with depth is no different from a conventional image.

One reason that it may be desirable to represent scenes as images with depth inside of a computer is that samples of images with depth can be mapped back to three dimensions and then re-projected onto arbitrary view planes, thus obtaining new views of the same scene. For example, a camera may be used to obtain a two-dimensional image of a scene and a laser range finder may be used to obtain depth values for each element of the sample. The elements from the sample may then be mapped back to three-dimensional space based on the depth values and mapped onto arbitrary projection planes. This is the essence of three-dimensional image warping, although three-dimensional image warping may not explicitly require mapping of samples to three dimensions before projecting the scene onto arbitrary viewing planes. The mapping is performed implicitly by the three-dimensional image warping equations.

FIG. 4 illustrates the operations performed in three-dimensional image warping. In FIG. 4, line segments 400 represent the scene geometry. For example, the line segments 400 may represent a horizontal section through a vertical scene, such as the walls in a room. In the illustrated example, the line segments 400 representing the scene geometry include a red segment 402, an orange segment 404, a green segment 406, and a blue segment 408. A first image $i_1$ is an image with depth taken from the center of projection $C_1$. For example, the image $i_1$ may comprise an array of pixels recorded by a camera and a depth value associated with each pixel representing the distance of the element in the scene to the center of projection $C_1$. Images $i_2$ and $i_3$ were obtained by warping (re-projecting) the image $i_1$ onto new image planes 412 and 414, respectively. Because the orange segment 404 is behind the green segment 406, when viewed from the center of projection $C_1$, samples from the orange segment 404 do not appear in the image $i_1$. As a result, when the image $i_1$ is warped into the image $i_2$, a hole 415 appears between a red area 416 and a green area 418 in the image $i_2$. The problem of holes appearing in a warped image is a reconstruction problem, and some action is required to fill such holes. In the absence of additional information, an educated guess consists of filling gaps with interpolated colors between adjacent samples from the original image For example, in the illustrated example, the hole 415 in the image $i_2$ should be filled with colors interpolated from red to green.

Another problem with three-dimensional image warping is that the one-to-one relationship between pixels in original and projected images may not hold. For example, in image $i_3$, samples from multiple surfaces are mapped to the same pixel. More particularly, samples from the red segment 402 and the blue segment 408 along projected ray 420 map to the same pixel in the image $i_3$. Because multiple pixels in the scene geometry 400 map to the same pixel in the image $i_3$, the one-to-one relationship between points of scene surfaces and their projections onto an image plane does not hold. One conventional solution in such cases is to search for the closest intersection of a projected ray with the scene to determine which pixel to display. In the illustrated example, since the intersection between the projected ray 420 and the blue segment 408 is closer to the image plane 414 than the point where the projected ray intersects the red segment 402, a blue pixel is displayed in the image $i_3$. Searching for the closest intersection along the projected ray is computationally expensive and, therefore unsuitable for interactive applications. In addition, because of the lack of one-to-one correspondence between pixels in the scene and pixels in the image plane, no inverse mapping is readily available. The lack of a convenient inverse mapping makes filtering difficult. However, forward three-dimensional image warping handles visibility among multiple surfaces. The main disadvantages of three-dimensional image warping are poor filtering and the appearance of holes.

In summary, three-dimensional image warping can re-project images with depth onto different image planes, thus producing new views of a scene. In one sense, three-dimensional image warping is the computer graphics analog of optical holograms: images change with viewpoint. Unfortunately, however, when a single image with depth is used, areas not visible in the original image may become exposed, producing holes in the final image. Also, because three-dimensional image warping is usually a many-to-one mapping, it does not have a cheap inverse formulation. Texture mapping has a simple inverse formulation but does not account for changes in occlusion relationships when views change.

Sprites with Depth

Sprites with depth enhance the descriptive power of traditional sprites with out-of-plane displacements per pixel. Sprites with depth are rendered using a two-step algorithm to compute the color of pixels in the destination image from pixels in a source image. In the first step, the displacement map associated with the source image is forward mapped using a 2-D transformation to compute an intermediate displacement map $d_3(x_3, y_3)$, which is then stored for later use. In the second pass, each pixel $(x_2, y_2)$ of the desired image is transformed by a homography (planar perspective projection) to compute intermediate coordinates $(x_3, y_3)$. Such coordinates are used to index the displacement map $d_3(x_3, y_3)$ computed in the first pass. The retrieved displacement value is then multiplied by the epipole $e_{21}$ and added to the result of the homography, producing the coordinates $(x_1, y_1)$ in the source image. Such coordinates are used to compute the color of the destination pixel $(x_2, y_2)$ by filtering the color of pixels in the neighborhood of $(x_1, y_1)$ in the source image. Sprites with depth are described in a publication entitled "Layered Depth Images" by Shade et al, Proceedings of SIGGRAPH 1998 (Jul. 19–24 1998). However, this publication does not describe how the intermediate displacement map $d_3$ is computed.

One variation of the algorithm described above for producing sprites with depth consists of, in the first step, forward mapping the displacement map associated with the source image to an intermediate image and for each pixel $(x_1, y_1)$ from the source image and its image $(x_3, y_3$ (in the intermediate image, the differences $u_3(x_3, y_3)=x_3-x_1$ and $v_3(x_3, y_3)=y_3-y_1$ are computed and stored for later use. During the second pass of the algorithm, each pixel $(x_2, y_2)$ of the desired image is transformed by a homography to compute intermediate coordinates $(x_3, y_3)$. Such coordinates are added to $(u_3(x_3, y_3), V_3(x_3, y_3))$ to produce the coordinates $(x_1, y_1)$ in the source image, whose neighborhood is then filtered to produce the color for $(x_2, y_2)$.

Although this approach is expected to produce smoother rendering than traditional forward mapping (splatting) techniques, the reconstruction is done using splats and holes may still occur.

In three-dimensional image production according to the present invention, each coordinate of the destination pixel depends only on its counterpart in the original pixel (i.e., $u_2$ does not depend on $v_1$, and $v_2$ does not depend on $u_1$). This enables three-dimensional image generation according to the present invention to be implemented efficiently as 1-D operations for both reconstruction and filtering. In addition, standard texture mapping hardware may be used to perform the final planar perspective warp. While sprites with depth should be used as rendering primitives only when viewed from a distance, the textures produced using the three-dimensional image generation techniques according to the present invention can be used even when the viewpoint is very near to the polygon, because all holes are completely filled during the reconstruction process.

Nailboards

A nailboard is a texture-mapped polygon augmented with a displacement value per texel specifying an amount by which its depth deviates from the depth of the represented view of an object. The idea behind nailboards is to take advantage of frame-to-frame coherence in smooth sequences. Thus, instead of rendering all frames from scratch, more complex objects are rendered to separate buffers and re-used as sprites as long as the geometric and photometric errors remain below a certain threshold. An error metric is therefore required. The displacement values associated with each texel are used to modulate the depth buffer of the final composite frame. In conjunction with partially transparent polygons, the associated displacements are used to solve visibility among other nailboards and conventional polygons. The depth values associated with nailboards are not utilized to perform image warping.

In light of the difficulties associated with conventional texture mapping, three-dimensional image warping, and sprites with depth there exists a need for improved methods and systems for producing three-dimensional images.

Disclosure of the Invention

According to the present invention, a scene is modeled using one or more relief textures. A relief texture is a texture in which each pixel includes a height or displacement value representing the distance between a surface sample and its orthogonal projection onto the basis plane of the relief texture. Each pixel may also include a color value and a normal vector. The normal vector is normal to the surface point represented by the relief texture pixel. Relief textures are different from conventional two-dimensional textures because of the addition of the height associated with each pixel. In addition relief textures are different from conventional images with depth used in three-dimensional image warping because the projections from which the height values are measured are parallel, rather than perspective projections.

Relief textures combine the holographic nature of three-dimensional image warping with the ability to use an inverse mapping which is desirable for filtering purposes. This is accomplished by solving the visibility problem, i.e., transforming the many-to-one mapping into a one-to-one mapping, and then using conventional texture mapping to handle the final transformation.

The improved methods and systems for producing three-dimensional images result from factoring the three-dimensional image warping equations into a pre-warp followed by standard texture mapping. The pre-warp handles only the parallax effects resulting from the direction of view and the displacement of texture elements. The subsequent texture mapping operation handles scaling, rotation, and the remaining perspective transformation.

The pre-warp equations have a simple one-dimensional structure that enables the pre-warp to be implemented using only one-dimensional image operations along scan lines and columns. In addition, pre-warping requires interpolation between only two adjacent pixels at a time. This allows efficient implementation in software and should allow a simple and efficient hardware implementation. Texture-mapping hardware common in graphics systems may be used to efficiently implement the final texture mapping stage of the warp.

The present invention includes methods appropriate for implementation in hardware and software for using relief textures to add realistic surface detail and to render complex scenes and objects.

It is an object of the present invention to provide methods and systems for generating three-dimensional images of objects that include advantages of both texture mapping and three-dimensional image warping.

It is another object of the present invention to provide methods and systems for generating three-dimensional images with a convenient inverse formulation and the ability to display the proper occlusion relationships in an image when the viewpoint changes.

While some of the objects of the invention have been stated hereinabove, other objects will become evident as the description proceeds, when taken in connection with the accompanying drawings as best described hereinbelow.

BRIEF DESCRIPTION OF THE DRAWINGS

The file of this patent contains at least one drawing executed in color. Copies of this patent with color drawing(s) will be provided by the Patent Trademark Office upon request and payment of necessary fee.

A description of the present invention will proceed with reference to the accompanying drawings, of which:

FIG. 7 illustrates the perspective camera model used to represent pre-warped images according to an embodiment of the present invention;

FIG. 8 illustrates the orthographic camera model used to represent relief textures according to an embodiment of the present invention;

FIG. 9 illustrates the orthographic camera model and the perspective camera model having a shared image plane according to an embodiment of the present invention;

FIG. 22(a) is a reconstructed view of a statue obtained by texture mapping two pre-warped images to two quadrilaterals;

FIG. 22(b) illustrates the reconstructed view of the statue in FIG. 22(a) showing the boundaries of the quadrilaterals in red;

FIGS. 23(a) and 23(b) are pre-warped images utilized to produce the images of FIGS. 22(a) and 22(b);

FIG. 31 is a diagram illustrating six perspective projection images utilized to produce a three-dimensional image where the viewpoint is inside of a transparent cube; and FIGS. 32(a)–32(c) illustrate various viewpoints located inside the cube of FIG. 31.

BEST MODE FOR PRACTICING THE INVENTION

Figure 5:
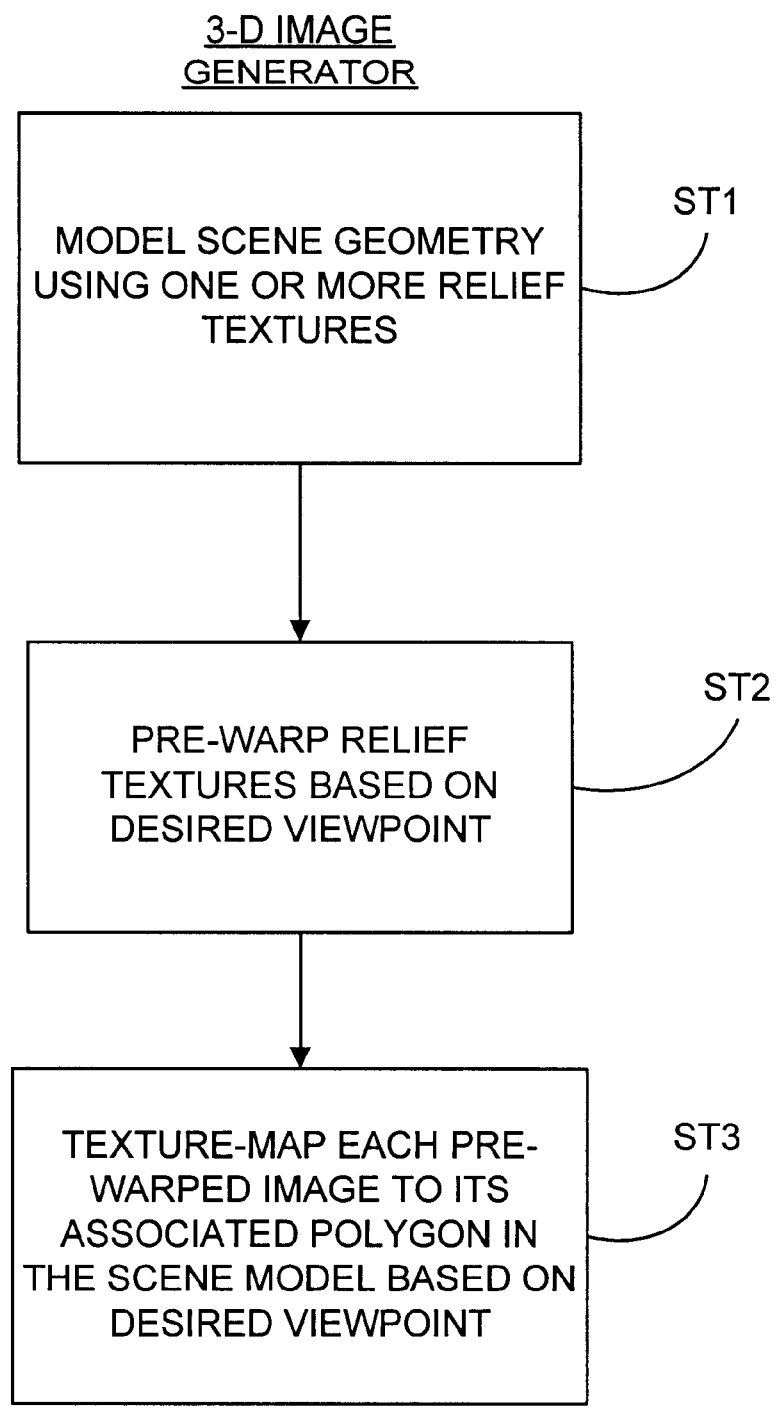
FIG. 5 is a flow chart illustrating a method for producing three-dimensional images according to an embodiment of the present invention.

The present invention includes methods and systems for generating three-dimensional images using relief textures. The methods and systems according to the present invention may be implemented in hardware, software, or a combination of hardware and software. FIG. 5 illustrates exemplary steps that may be performed in generating a three-dimensional image according to the present invention. In step ST1, the scene is modeled using one or more relief textures. Once the scene has been modeled, each relief texture is pre-warped to its own basis according to the desired viewpoint. (step ST2) After the images have been pre-warped to basis planes of the relief textures, the pre-warped images are texture mapped onto the associated polygons used to model the scene based on the desired viewpoint. (step ST3) Each of these steps will now be described in more detail.

Figure 6:
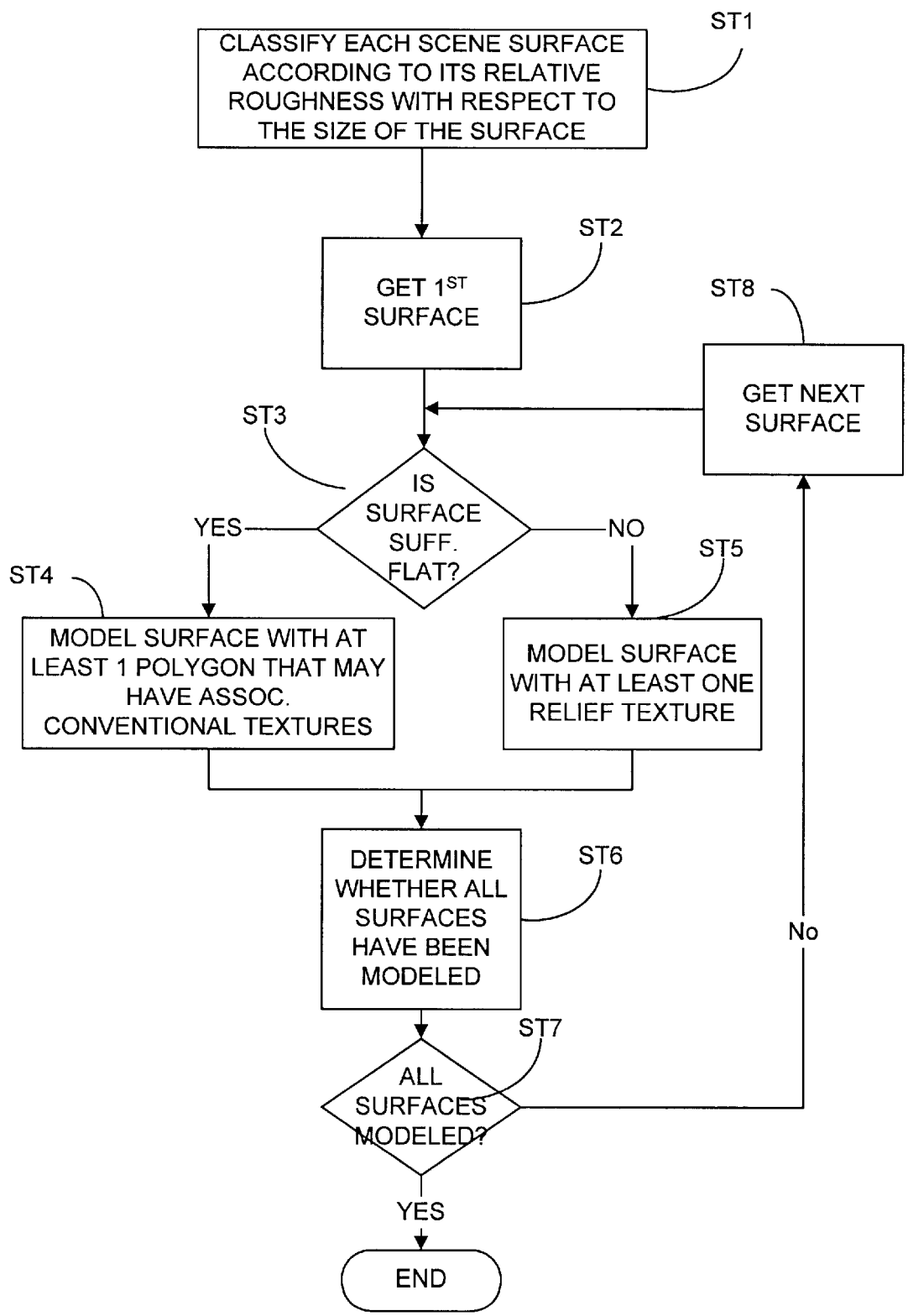
FIG. 6 is a flow chart illustrating an exemplary scene modeling procedure according to an embodiment of the present invention.

FIG. 6 illustrates an exemplary scene modeling routine that may be utilized to model a scene according to the present invention. In step ST1, the scene modeling routine classifies each surface in a scene according to its relative roughness with respect to the size of the surface. For example, if the scene is a desktop containing many stacks of papers and a telephone, the desk top may be modeled as a surface, each stack of papers may be modeled as a surface, and the telephone may be modeled as a surface. In step ST2, the routine extracts the first surface and determines whether the surface is sufficiently flat to be modeled with a two-dimensional polygon that may have a conventional two-dimensional texture associated to it or whether the surface should be modeled using a relief texture. (step ST3) The determination of whether the surface should be modeled using two-dimensional polygons or relief textures is subjective and depends on the degree of detail desired in the final image. In step ST5, if the surface is determined to be sufficiently rough, then the surface is modeled using one or more relief textures. In the above example, the surface modeling the telephone may require one or more relief textures to model the buttons and the handset. Alternatively, in step ST4, if the surface is determined to be smooth, the surface is modeled using conventional polygons and associated conventional textures. In the above example, the top page of a given stack of papers may be modeled by a rectangle and an associated texture containing the matter printed on the page. In steps ST6 and ST7, it is determined whether all surfaces have been modeled. If all surfaces have been modeled, the routine ends. In step ST8, if all surfaces have not been modeled, the scene modeling routine extracts the next surface and repeats steps ST3–ST7. Once the scene has been modeled, images of the scene can be projected to arbitrary viewing planes in a manner that reflects the proper occlusion relationships between objects in the scene and at interactive rates.

Pre-Warping Relief Textures

Height-field rendering may result in a many-to-one mapping. Thus, no inverse operation can be directly applied. According to the present invention, the three-dimensional image warping operation is reformulated as a two-phase process. The first step in the process is a pre-warp that handles parallax only by projecting the relief texture onto its own basis. The second step in the process is inverse texture mapping operation applied to the resulting flat image.

The pre-warp according to the present invention is based on the conventional three-dimensional image warping equations described above. However, in conventional three-dimensional image warping, both the source and destination images are based on a perspective camera model. In the pre-warp operation according to one embodiment of the present invention, the source image, i.e., the relief texture, is based on an orthographic camera model and the destination image is based on a perspective camera model. Thus, the three-dimensional image warp converts the orthographic relief texture into a two-dimensional texture with correct perspective.

FIG. 7 illustrates a perspective projection camera model used for the source image in conventional three-dimensional image warping and for the destination image in three-dimensional image warping according to the present invention. In FIG. 7, the grid represents an image plane for the perspective camera model. The image plane is defined by orthogonal vectors $\vec{a}$ and $\vec{b}$. The length of the vectors $\vec{a}$ and $\vec{b}$ define the width and height of a pixel in the image plane. $\dot{C}_2$ is the center of projection of the camera. $\vec{c}$ is a vector from the center of projection to the origin of the image plane. FIG. 8 illustrates the orthographic camera model used for the source image of three-dimensional image warping according to the present invention. In FIG. 8, the image plane for the orthographic camera model is defined by orthogonal vectors $\vec{a}$ and $\vec{b}$. The length of the vectors $\vec{a}$ and $\vec{b}$ define the width and height of a pixel in the image plane. The center of projection for the orthographic camera model is located at infinity. $\vec{f}$ is a unit vector orthogonal to the plane spanned by vectors $\vec{a}$ and $\vec{b}$.

According to an important aspect of the invention, the conventional three-dimensional image warping equations can be greatly simplified if the desired image plane is parallel to the original image plane, with no relative rotation between the desired and original image planes. Thus, prior to pre-warping the relief texture, the relief texture is preferably re-parameterized so that its basis plane matches the polygon onto which the resulting pre-warped image will be mapped. Once the relief texture is re-parameterized and pre-warped, the resulting image (pre-warped texture) is used as a conventional two-dimensional texture that is mapped onto the associated polygon that is then projected onto the desired image plane. FIG. 9 illustrates parallel and perspective camera models that share the same image plane. In other words, the image planes share $\vec{a}$ and $\vec{b}$ vectors. The image planes also have a common origin $\dot{C}_1$. Because the source and result images of the pre-warping operation according to the present invention share a common image plane, the resulting pre-warping equations according to the present invention for converting a relief texture into a pre-warped image are as follows:

$$u_2 = \frac{u_1 + k_1 displ(u_1, v_1)}{1 + k_3 displ(u_1, v_1)} \tag{5}$$

$$v_2 = \frac{v_1 + k_2 displ(u_1, v_1)}{1 + k_3 displ(u_1, v_1)} \tag{6}$$

where $k_1$, $k_2$, and $k_3$ are constants defined as follows:

$$k_1 = \frac{\vec{f} \cdot (\vec{b} \times \vec{c})}{\vec{a} \cdot (\vec{b} \times \vec{c})}, \ k_2 = \frac{\vec{f} \cdot (\vec{c} \times \vec{a})}{\vec{a} \cdot (\vec{b} \times \vec{c})} = \frac{\vec{f} \cdot (\vec{c} \times \vec{a})}{\vec{b} \cdot (\vec{c} \times \vec{a})} \text{ and}$$

$$k_3 = \frac{\vec{f} \cdot (\vec{a} \times \vec{b})}{\vec{a} \cdot (\vec{b} \times \vec{c})} = \frac{\vec{f} \cdot (\vec{a} \times \vec{b})}{\vec{c} \cdot (\vec{a} \times \vec{b})}.$$

Separating conventional three-dimensional image warping into the steps of solving for visibility and performing perspective distortion (pre-warping) and applying texture mapping results in simplified pre-warping equations. For example, Equations (5) and (6) are each one-dimensional, i.e., $u_2$ does not depend on $v_1$, and $v_2$ does not depend on $u_1$. Thus, all operations are constrained to rows and columns of the input images, which greatly simplifies the hole-filling or interpolation operation. The one-dimensional structure of the pre-warping equations has several other advantages, such as making the filtering operations, commonly referred to as anti-aliasing, much simpler. Once the visibility among multiple surfaces of the scene has been solved and holes have been filled, the intermediate representation or pre-warped image is texture-mapped in the conventional way.

The present invention is not limited to Equations (5) and (6) for pre-warping relief textures. For example, a person of ordinary skill in the art will recognize that Equations (5) and (6) may be modified to account for translations between the image plane of the relief texture and the image plane of the pre-warped image. These changes are within the scope of the invention because the resulting equations will retain the one-dimensional relationship between coordinates in the relief texture and coordinates in the pre-warped image, provided that the image plane of the relief texture is parallel to the image plane of the pre-warped image.

Summarizing, the relief texture mapping algorithms according to the present invention use simplified versions of Equations (3) and (4), from which all transformations present in Equations (1) and (2) are factored, to solve for visibility. The new equations (Equations (5) and (6)) have a simple one-dimensional structure that leads to cheap and easy hole filling. The resulting image is then conventionally texture-mapped, taking advantage of efficient graphics hardware. As a result, the relief texture-mapping algorithms according to the present invention combine the view/motion parallax handling capabilities of three-dimensional image warping with the superior filtering and efficiency of inverse texture mapping. Three-dimensional image warping alone presents poor filtering and hole filling because no efficient inverse formulation suitable for interactive applications is known. On the other hand, texture mapping alone cannot handle view/motion parallax. Thus, the relief texture mapping algorithms according to the present invention may include a process for adding view motion parallax to conventional textures and efficient ways to implement inverse image warping.

Occlusion-Compatible Order for Height Fields

Figure 10:
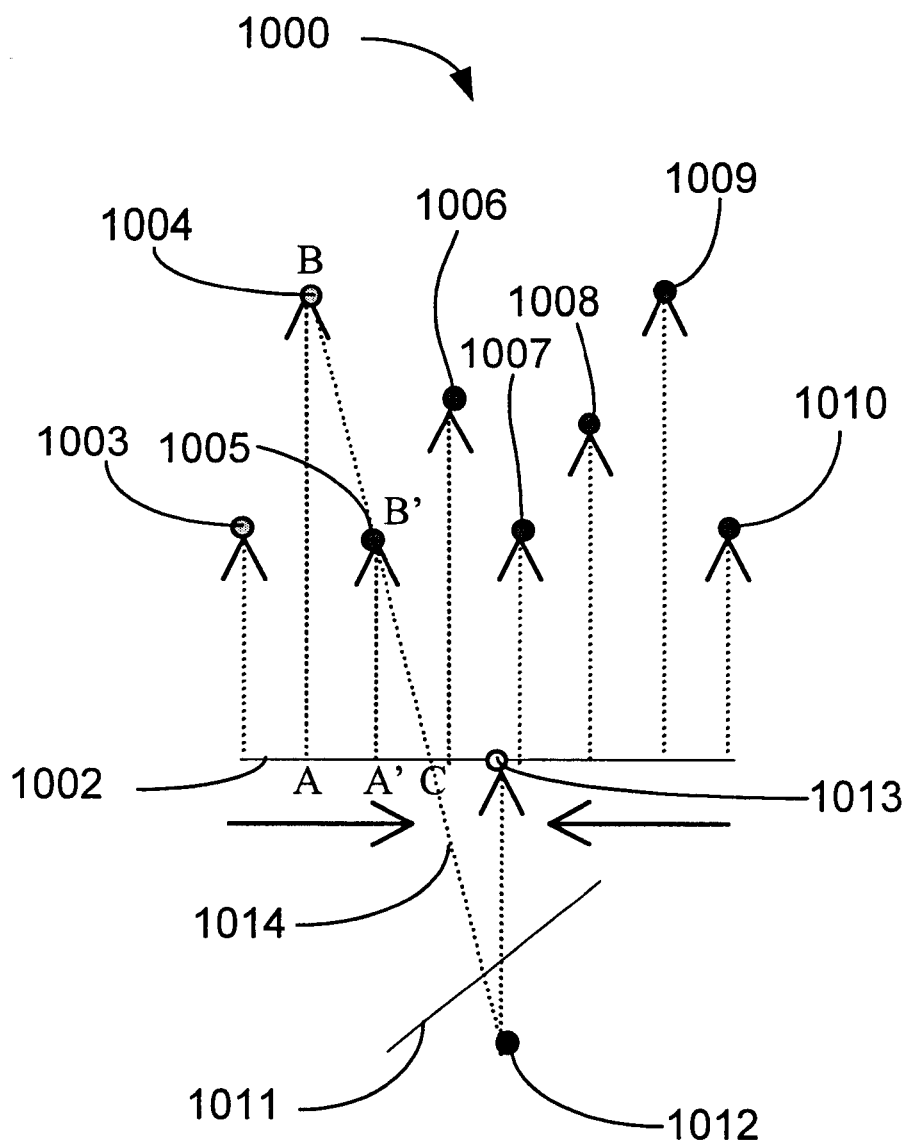
FIG. 10 is a side view of a relief texture illustrating pre-warping in occlusion-compatible order according to an embodiment of the present invention.

Since a relief texture is modeled based on orthogonal projections of pixels onto the basis plane of the relief texture, a relief texture is a parallel projection image. The center of projection (COP) of a parallel projection image is located at infinity. The pre-warping operation according to the present embodiment includes mapping the relief texture onto its own basis plane. The epipole is the orthogonal projection of the destination COP onto the plane of the parallel projection image, i.e., the plane containing the relief texture. FIG. 10 illustrates a relief texture 1000 defined by a basis plane 1002 and height samples 1003–1010. A desired image plane 1011 for the pre-warped image has a center of projection 1012. An epipole 1013 is a projection from the center of projection 1012 of the desired image plane 1011 to the basis plane 1002. A viewing ray 1014 represents a perspective projection of the relief texture onto the desired image plane 1011. The viewing ray 1014 intersects both height samples 1004 and 1005, forming similar triangles ABC and A'B'C. By similarity of triangles, whenever two samples fall along the same viewing ray, the sample having the orthogonal projection closer to the epipole is closer to the viewer (center of projection 1012). The pixel having orthogonal projection that is closer to the epipole appears in the desired image and other pixels intersecting the same viewing ray are hidden or occluded. Thus, an occlusion-compatible order for relief textures is obtained by warping pixels from the borders of the basis plane of the relief texture towards the epipole. In other words, pixels that are further from the epipole can be overwritten in the projected image by pixels that are closer to the epipole and fall along the same viewing ray. Comparison of height for the pixels is not required. Thus, pixels are preferably warped from the parallel projection image, i.e., from the relief texture, to a perspective projection image, i.e., to the pre-warped image in the same basis plane of the relief texture or to a fully warped image to the desired viewing plane, in a direction towards the epipole, to avoid unnecessary comparisons.

Pre-Warping and Reconstruction

The previous discussion illustrates methods for determining coordinates of infinitesimal points in the destination image from points in the source image. Determining these points is only the beginning of the pre-warping process. The more computationally expensive step is reconstruction and resampling onto the pixel grid of the destination image. The simplest and most common approaches to reconstruction and resampling are splatting and meshing. Splatting requires spreading each input pixel, i.e., each relief texture pixel, over several output pixels, i.e., pixels in the pre-warped image, to assure full coverage and proper interpolation. Meshing requires rasterizing a quadrilateral for each pixel in the N×N input texture. The multiple writes of splatting and the setup overhead of rasterizing tiny quadrilaterals makes either approach very expensive. Splats usually involve additional costs associated with splat-shape calculation and antialiasing.

Figure 11:
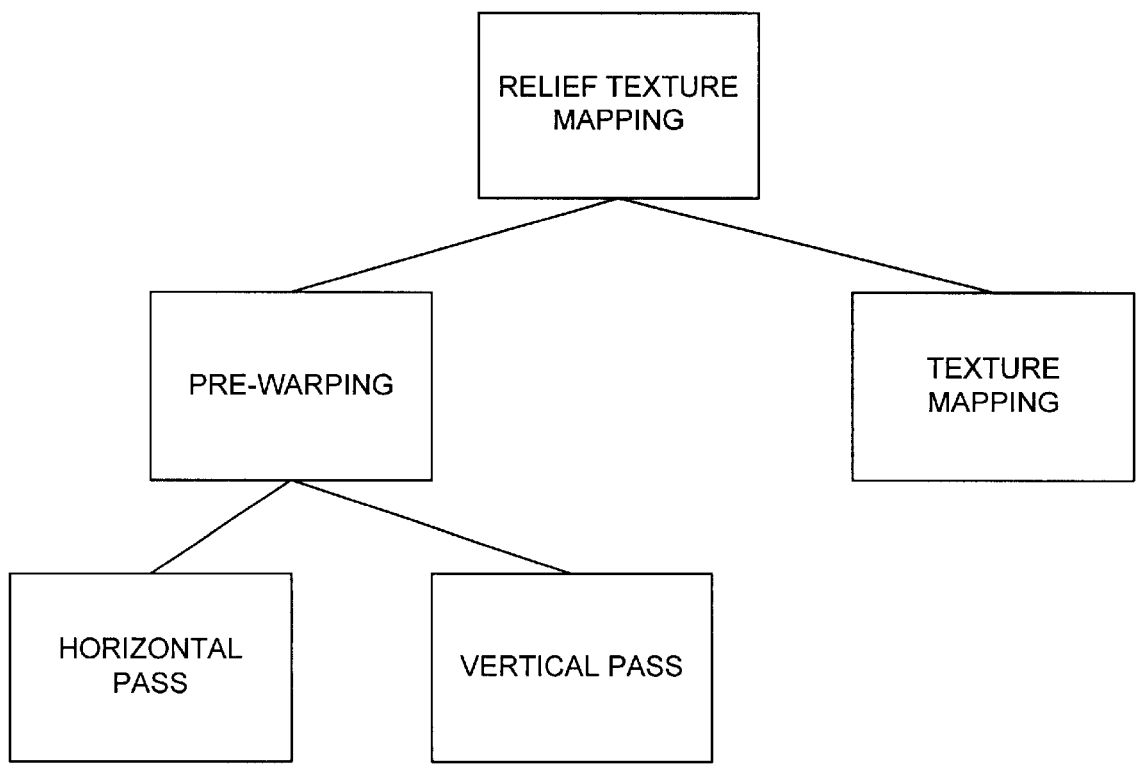
FIG. 11 is a block diagram illustrating an exemplary hierarchy for a two-pass pre-warped image generation process according to an embodiment of the present invention.

The special structure of the pre-warp equations according to the present invention allows implementation of reconstruction and resampling as a two-pass process using one-dimensional transforms in scan-line order. It is important to distinguish between the two steps of the present method for producing three-dimensional images: pre-warping followed by texture mapping, and the two phases used to implement the pre-warping step itself. The phases used to implement the pre-warping include a horizontal pass and a vertical pass. FIG. 11 illustrates an exemplary hierarchy for a two-pass approach to pre-warping according to an embodiment of the present invention. Exemplary two-pass pre-warping approaches are described below utilizing pseudocode and flow charts. The description of the two-pass approach is followed by a description of a pipelined approach. The description of the pipelined pre-warping approach is followed by a description of a mesh-based pre-warping algorithm.

Two-Pass Pre-Warp Implementation

According to an aspect of the invention, mapping a relief texture into a pre-warped image may comprise a two-pass approach including a horizontal pass and a vertical pass. In the two-pass approach, the horizontal pass may be performed before the vertical pass, or the order may be reversed. Either order is within the scope of the invention. Each scan line is processed independently with all output pixels going to the same scan line in the output texture, i.e., an intermediate stage of the pre-warped image. The pre-warping equations, Equations (5) and (6), illustrate that the output column coordinate $u_2$ is a function of only the input column coordinate $u_1$ and the input displacement or height, not the input row number. The elements of each row are preferably processed in occlusion-compatible order by starting with the element furthest from the epipole and working towards the epipole. The following pseudocode illustrates the pre-warping of a single pixel in occlusion compatible order when the epipole is to the right and the pre-warp proceeds left to right.

```
get I_in, C_in, D_in
I_next=Equation_5 (I_in, D_in)
for(I_out=integer(I_prev+1);I_out≦I_next;I_out++)
    linearly interpolate C_out between C_prev and C_in
    linearly interpolate D_out between D_prev and D_in
    put I_out, C_out, D_out
I_prev=I_next; C_prev=C_in, D_prev=D_in
```

In the above-illustrated pseudocode, $I_{in}$, $C_{in}$, and $D_{in}$ respectively indicate index, color, and displacement of a pixel in the relief texture. $I_{out}$, $C_{out}$, and $D_{out}$ respectively indicate the index, color, and displacement of the pixel in the pre-warped image. For the two-pass pre-warp operation, the "get" and "put" operations in the pseudocode are reads and writes of the pixel at the indicated index position. For each successive pixel in the input image, the output element index is computed based on the input element index and the displacement of the pixel. A function, Equation_5, calculates the output element index for each pixel. Each output element index is compared with a previously calculated output element index to locate holes in the pre-warped image. If holes are found, the pseudocode linearly interpolates the color and displacement between the previous and current output element indices, sampling at each output pixel center. The "put" statement in the pseudocode stores both the color and the displacement for the output pixel because the next pass needs both. If the computed output element index for a pixel is to the left of the previous element index, i.e., if $I_{out}>I_{next}$, this element is in an occluded region in the output (a back facing part of the map) and no writes are required. Antialiasing can be implemented using any conventional method, for example as described in "A Nonaliasing Real-Time Spatial Transform Technique," IEEE Computer Graphics and Applications, Vol. 6, No. 1, January 1986, pp. 71–80. After the horizontal warp has processed all the rows, the same algorithm is applied to the columns of the output. This pass handles the vertical shifts of pixels.

Two-Pass Pre-Warped Image Generator

Figure 11A:
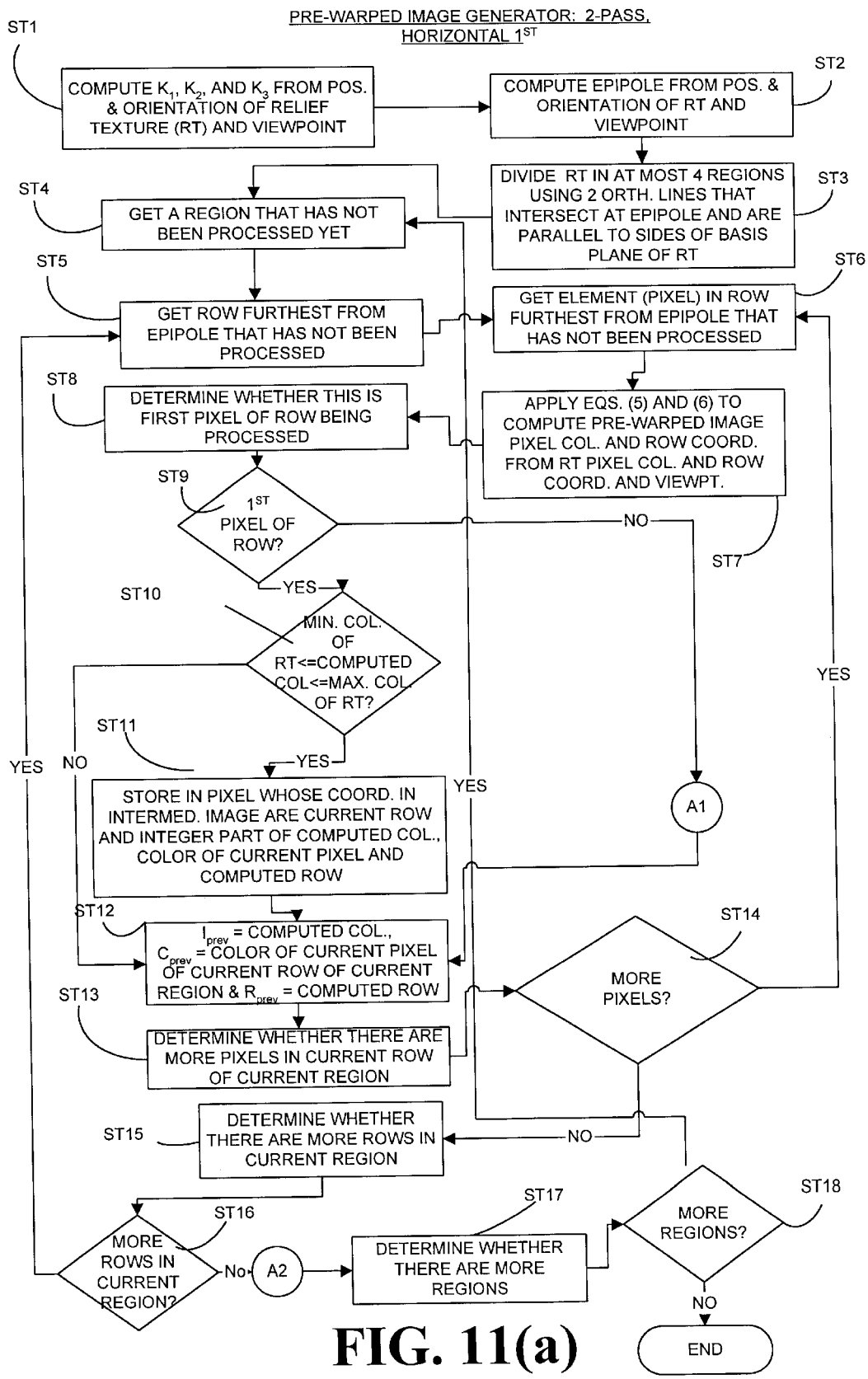
FIGS. 11(a)–11(d) are flow charts illustrating a two-pass pre-warped image generator according to an embodiment of the present invention.
Figure 11B:
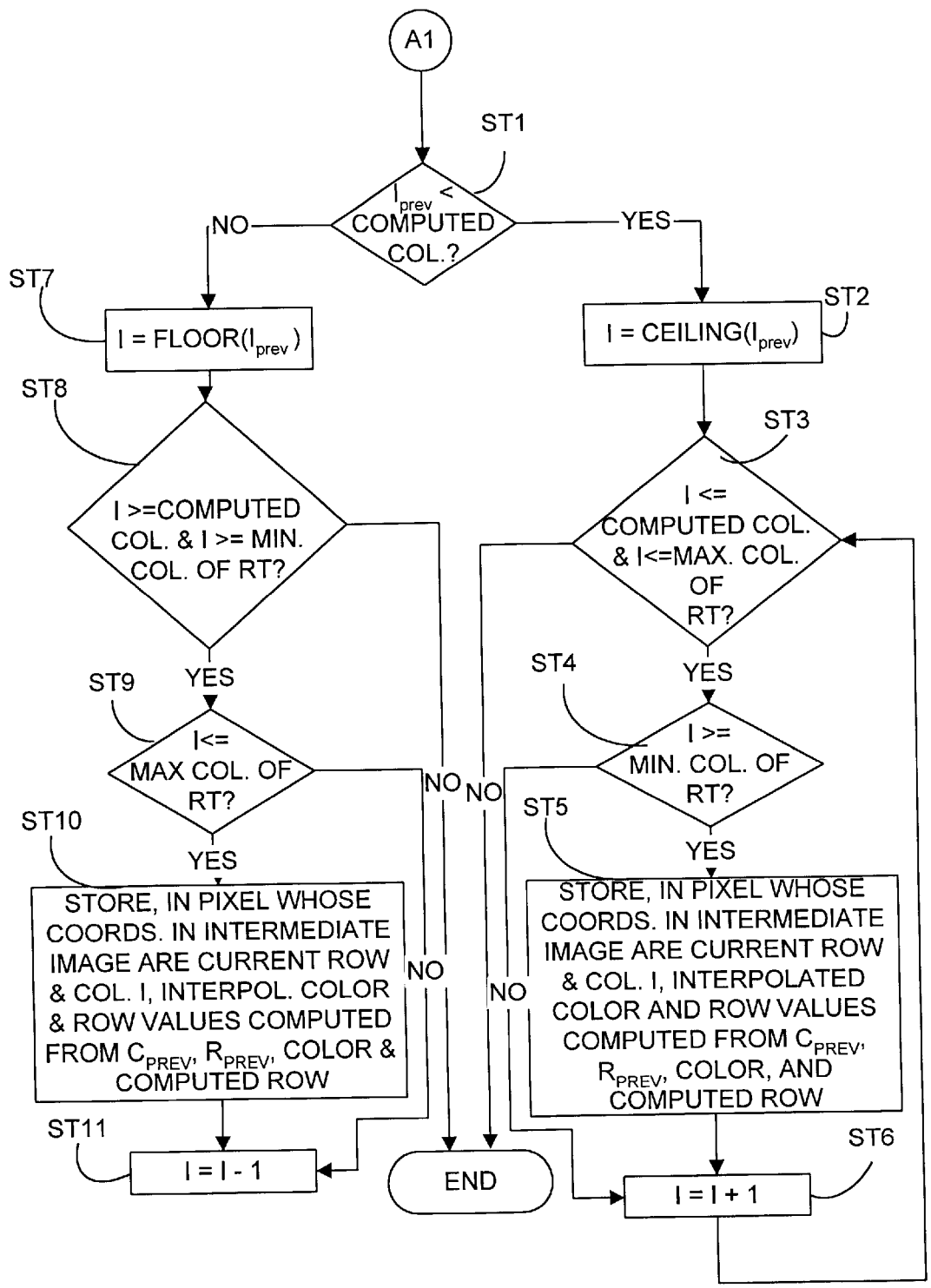
Figure 11C:
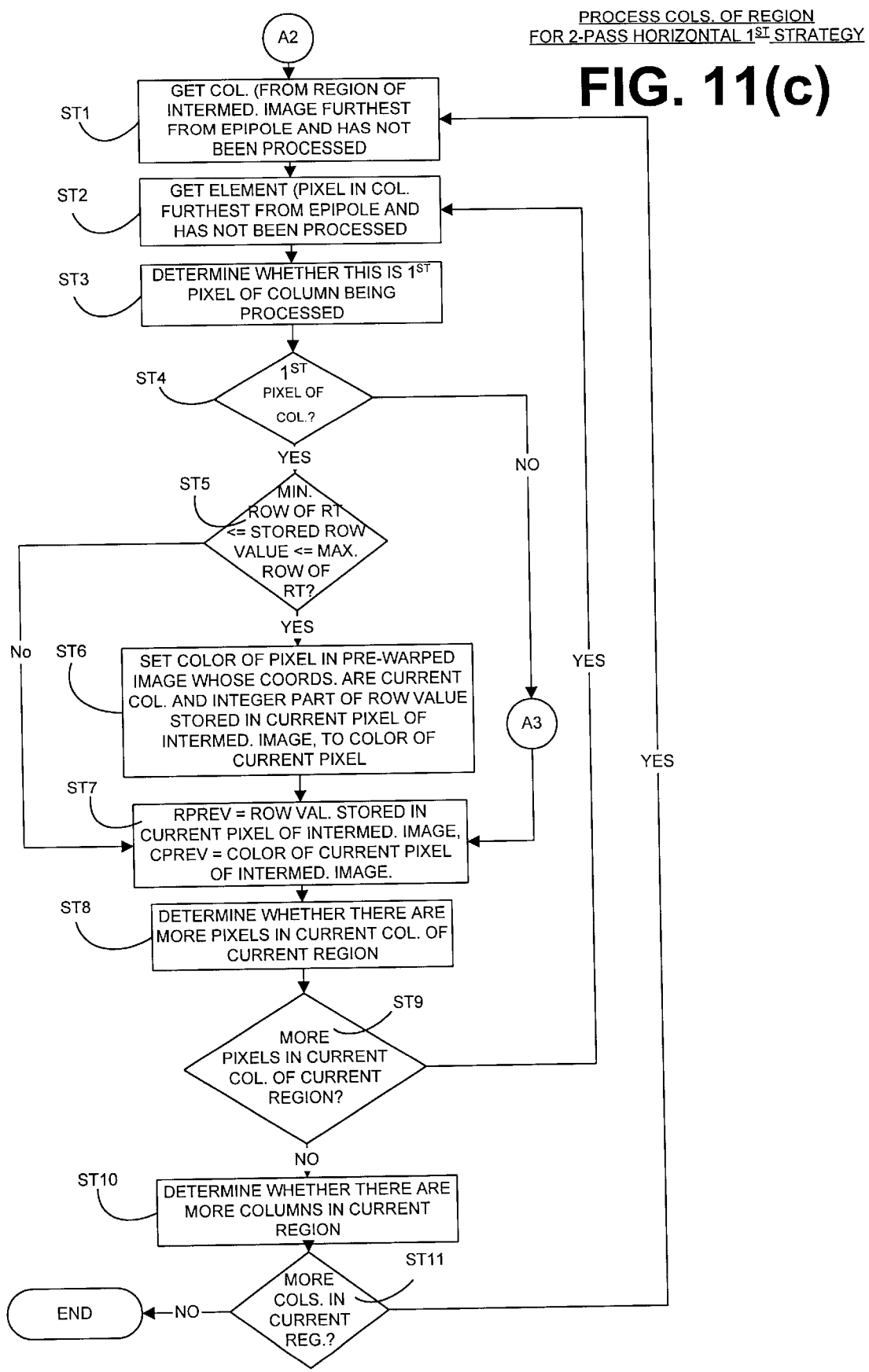

The pseudocode listed above illustrates one method for performing two-pass pre-warping. However, because the method interpolates displacement for each pixel in the horizontal pass, errors in the pre-warped image due to nonlinearities in Equations (5) and (6) may happen. FIGS. 11(a)–11(c) illustrate an alternative method for performing two-pass pre-warping. In the flow chart illustrated in FIGS. 11(a)–11(c) the horizontal pass is performed before the vertical pass. However, as stated above, the performing the vertical pass before the horizontal pass is within the scope of the invention.

In step ST1 of FIG. 11(a), the generator computes the constants $k_1$, $k_2$, and $k_3$. These constants depend the relationship between the desired viewpoint and the base of the relief texture. These constants are used to compute pre-warped image pixel coordinates from relief texture pixel coordinates using Equations (5) and (6).

Figure 12:
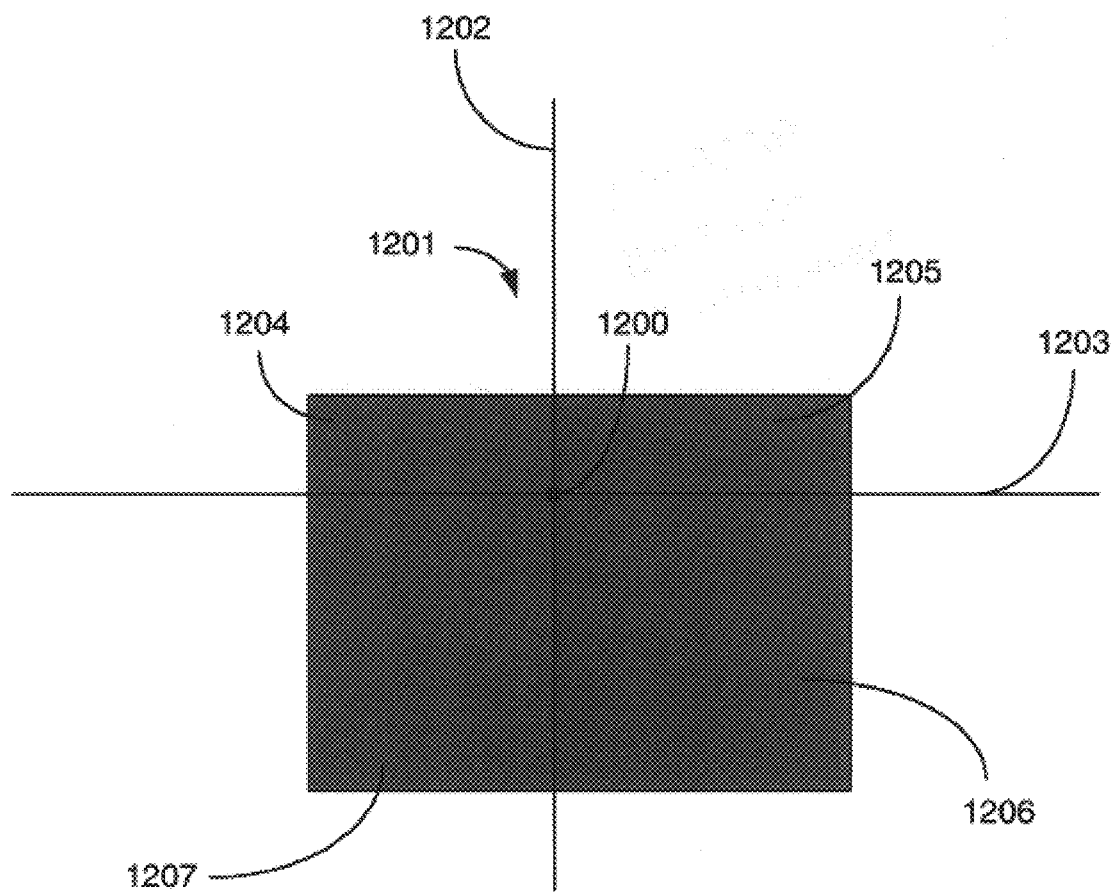
FIG. 12 is a plan view of a relief texture, an epipole, and regions according to an embodiment of the present invention.

In step ST2, the pre-warped image generator computes the position of the epipole. As stated above, the epipole is an orthogonal projection from the center of projection of the desired image plane to the basis plane of the relief texture. The location of the epipole is utilized to pre-warp pixels of the relief texture to the pre-warped image in occlusion compatible order. The epipole may fall within or outside of the basis plane of the relief texture. The location of the epipole determines the number of regions into which the relief texture will be divided during the pre-warping process. For example, in step ST3, the relief texture is divided into no more than four images according to the location of the epipole. FIG. 12 illustrates the case where the epipole is located within the relief texture. In FIG. 12, an epipole 1200 is within relief texture 1201. Dividing lines 1202 and 1203 divide the relief texture into four regions 1204–1207. The reason that the relief texture is divided into regions is that pre-warping operations in each of the regions can proceed towards the epipole for occlusion-compatible warping order. For example, in region 1204, pixels are preferably warped along each row from left to right, since pixels to the right are closer to the epipole. Similarly, pixels in each column are preferably warped in each column from top to bottom, since pixels near the bottom are closer to the epipole. Similar operations preferably occur in the remaining regions such that the pixels are warped in occlusion compatible order. As stated above, warping pixels in occlusion-compatible order is preferred because the depth value comparisons between pixels are reduced. In an alternative routine, the relief texture may not be divided into regions and occlusion relationships between pixels in the pre-warped image may be determined by comparing depth or Z buffer values. In embodiments of the invention that utilize Z buffering to determine proper occlusion relationships between pixels in the pre-warped image, one-dimensional pre-warping equations, such as Equations (5) and (6), may still be applied to compute pixel locations in the pre-warped image.

In step ST4, the pre-warped image generator extracts a region that has not been processed. In step ST5, a row that is furthest from the epipole is extracted and the pixel in that row that is furthest from the epipole is extracted. In step ST7, Equations (5) and (6) are applied to compute pre-warped pixel row and column coordinates from the row and column coordinates of the extracted pixel and the desired viewpoint. Even though the horizontal pass preferably only shifts the pixel horizontally, Equation (6) is used to pre-compute and store the vertical coordinate for the extracted pixel in order to reduce computations during the vertical pass. In addition, pre-computing the vertical coordinate of the pixel reduces visual artifacts in the pre-warped image caused by interpolation errors, as will be discussed in more detail below. In an alternative routine, the pre-warped image generator may pre-compute each pixel column coordinate during the vertical pass, in the case where the vertical pass precedes the horizontal pass.

In step ST9, the pre-warped image generator determines whether the pixel is the first pixel in the row of the current region. If the pixel is the first pixel in the row, the pixel will be used to define a color value for empty pixel locations in the pre-warped image. In step ST10, it is determined whether the computed pixel column is within the horizontal boundaries of the relief texture. If the computed pixel column is within the horizontal boundaries of the relief texture, the pre-warped image generator stores the color of the pixel and the computed row in the intermediate image. (step ST11) The coordinates of the pixel in the intermediate image are determined by the current row and the integer part of the computed column. The reason that the integer part of the computed column is utilized to determine the pixel coordinates in the intermediate image is that Equation (5) may result in a non-integer pixel column coordinate.

Whether the computed pixel location is within or outside of the horizontal boundaries of the pre-warped image, since the pixel is the first pixel in the row, its color value may be used to interpolate color values for empty locations in the pre-warped image. Accordingly, in step ST12, the variable $I_{prev}$ is initialized to the computed column, the value $R_{prev}$ is initialized to the computed row, and the variable $C_{prev}$ is initialized to the color of the pixel being pre-warped.

In steps ST13 and ST14, it is determined whether any pixels remain in the current row of the current region. If pixels remain in the current row, steps ST6–ST8 are repeated to extract the next pixel from the relief texture and compute its row and column coordinates in the pre-warped image. However, because this pixel is not the first pixel in the row, in step ST9, the routine proceeds to connector A1, which leads to FIG. 11(b). In step ST1 of FIG. 11(b), the pre-warped image generator determines whether the computed column is less than the value stored in the variable $I_{prev}$. This test determines the relative location of the computed column and the previously computed pixel column in the row of the pre-warped image. If $I_{prev}$ is less than the computed column, the pixel corresponding to the computed column may be located to the right of the previously warped pixel. Accordingly, in step ST2, a current index test variable I is initialized with ceiling($I_{prev}$), i.e., one pixel location to the right of integer($I_{prev}$) if $I_{prev}$ is a fractional number, or with $I_{prev}$, otherwise. In step ST3 it is determined whether I is less than or equal to the computed column and less than or equal to the maximum column of the relief texture. Determining whether I is less than or equal to the computed column determines whether holes exist between the computed pixel column and the previous pixel column. If holes exist, ST4 tests whether I is greater than or equal to the minimum column of the relief texture. If the test fails, the index test variable I is incremented in ST6. If the test succeeds, the interpolated pixel color and row values are stored in the pixel in the intermediate image having the current row and column 1. In step ST6, the index test variable I is incremented and steps ST3 to ST5 are repeated to fill any remaining holes in the current row of the intermediate image. Steps ST7–ST11 of FIG. 11(b) are similar to steps ST2–ST6 for filling holes when the computed pixel value is to the left of the previously computed pixel value. Once all of the holes in a row between the current and previous pixels are filled, the routine illustrated in FIG. 11(b) ends and control returns to step ST12 in FIG. 11(a). In step ST12, the variables $I_{prev}$, $C_{prev}$, and $R_{prev}$ are set to the computed column, the color, and the computed row of the current pixel, respectively. In step ST14, it is determined whether any pixels remain in the current row. If pixels remain, steps ST6–ST9 in FIG. 11(a) are repeated to determine the location of the pixel in the intermediate image, and the steps in FIG. 11(b) are repeated to store interpolated color and row values for holes in the current row.

When all of the pixels in the row of the current region of the relief texture have been processed, the pre-warped image generator determines whether any rows remain in the current region. (step ST15) If no rows remain, control proceeds to FIG. 11(c) through connector A2 for the vertical pass of the pre-warped image generator. In step ST1 of FIG. 11(c), the column furthest from the epipole in the current region is extracted from the intermediate image formed as a result of the horizontal pass on that region. In step ST2, the pixel in the current column that is furthest from the epipole is extracted. In steps ST3 and ST4, the pre-warped image generator determines whether the current pixel is the first pixel in the column. If the pixel is the first pixel of the column, then the previously computed pixel row coordinate is checked to determine whether it is within the boundaries of the relief texture. If the pixel is within the boundaries, then the pre-warped image generator sets the color of the pixel in the pre-warped image having a column equal to the current column and the integer part of the row value stored in the current pixel. (Step ST6) In step ST7, $R_{prev}$ is set to the row value stored in the current pixel and $C_{prev}$ is set to the color of the current pixel for interpolation purposes. In steps ST8 and ST9, it is determined whether pixels remain in the current column. If pixels remain, the current pixel is extracted from the intermediate image. (step ST3) However, since the current pixel is not the first pixel in the row, control proceeds to FIG. 11(d) through connector A3.

Figure 11D:
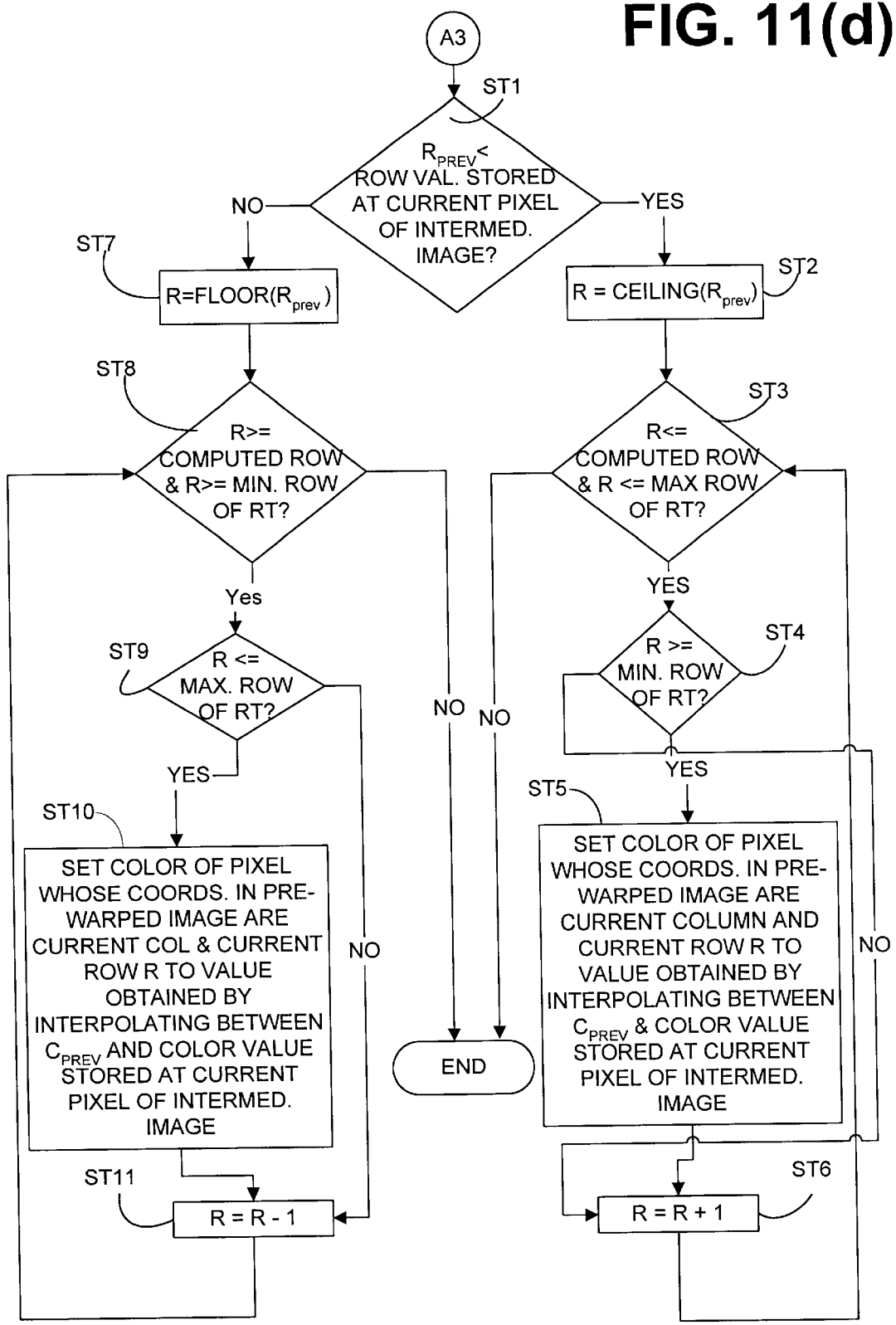

In FIG. 11(d), the pre-warped image generator determines whether $R_{prev}$ is less than the row value stored with the current pixel. (step ST1). If the $R_{prev}$ is less than the stored row value, the current pixel may be below the previously computed pixel. Accordingly, in step ST2, the pre-warped image generator sets R to ceiling($R_{prev}$). In step ST3, it is determined whether R is less than or equal to the computed row and whether R is less than or equal to the maximum row in the relief texture. If R is less than or equal to the computed row, holes may exist between the computed row and the previously computed row. In step ST4, it is tested whether R is greater than or equal to the minimum row of the relief texture. If the test fails the index test variable R is incremented in ST6. If the test succeeds, in step ST5, the pre-warped image generator sets the color of the pixel in the pre-warped image having coordinates equal to the current column and row equal to R to a color interpolated between $C_{prev}$ and the color value stored with the pixel in the intermediate image. In step ST6, R is incremented and steps ST3–ST5 are repeated to fill any remaining pixels in the current column of the pre-warped image. Steps ST7–ST11 proceed in a similar manner to steps ST2–ST6 for the case that the previously computed pixel is below the current computed pixel. Once all of the holes in a column have been filled, the routine in FIG. 11(d) ends and control returns to step ST7 in FIG. 11(c).

In step ST7 of FIG. 11(c), the variables $R_{prev}$ and $C_{prev}$ are set to the row stored in the current pixel of the intermediate image and to the color of the current pixel, respectively. In steps ST8 and ST9, it is determined whether any pixels remain in the current column. If pixels remain, steps ST2–ST8 in FIG. 11(c) are repeated to determine the location of the pixel in the pre-warped image, and the steps in FIG. 11(c) are repeated to fill holes in the pre-warped image. In steps ST10 and ST11, the pre-warped image generator determines whether any columns remain in the current region. If columns remain, the previously described steps are repeated to warp the pixels in each column. When the final column in the region is processed, the routine illustrated in FIG. 11(c) ends and control returns to step ST17 in FIG. 11(a). In step ST17, it is determined whether regions remain to be warped. If regions remain, all of the preceding steps of the two-pass pre-warped image generator are repeated for each remaining region. In this manner, the pixels in the relief texture are warped to the basis plane of relief texture such that the basis plane appears perspectively correct when viewed from the desired viewpoint. Holes in the pre-warped image are filled using interpolation between pairs of pixels as described above. Even though some occlusion errors may result from dividing the pre-warp into horizontal and vertical passes, such a routine is easy to implement in software.

Pipelined Pre-Warp Implementation for Correct Visibility

Figure 13:
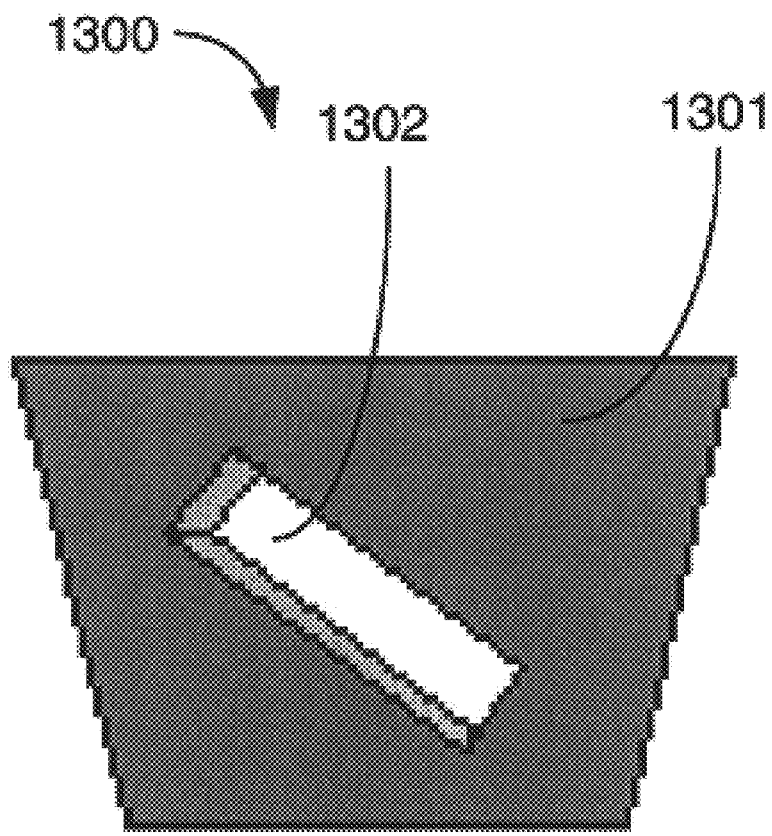
FIG. 13 is perspective view illustrating a relief texture having a large number of pixels with zero displacements and a diagonal region of pixels with larger displacements.

The straightforward two-pass implementation of the pre-warp described above may cause information to be lost under certain conditions, such as when the relief texture being pre-warped has a long narrow diagonal region of pixels with greater displacement than their surroundings. FIG. 13 illustrates a relief texture having a region with a large proportion of pixels having zero displacement and a diagonal slot of large displacement. In FIG. 13, a plane 1300 includes a green region 1301 representing pixels having zero displacement. A yellow region 1302 represents a deep region where the pixels have a non-zero displacements. An epipole 1303 is located in the lower-right corner of the plane 1300. Because the pixels in the green region have zero displacement, these pixels will have the same coordinates in the input and pre-warped textures, i.e., $u_2=u_1$ and $v_2=v_1$. The pixels in the deep region 1302 are below the plane 1300 and should move down and to the right because the epipole 1303 is in the lower right corner of the plane 1300. However, when pixels move to the right during the horizontal pass, they are occluded by pixels on the same row. The vertical pass has no information about the occluded pixel and thus cannot move the pixel down to the final location. However, these situations are restricted to isolated pixels and cannot be considered as true bottlenecks, which are characterized by a contraction followed by an expansion of the image area. Foldovers occur when perspective projections of non-planar patches cause multiple samples to map the same pixel on the screen. Since foldovers are due to the three-dimensional nature of the represented surfaces, these problems may occur.

According to another aspect of the invention, horizontal and vertical pre-warp operations may be interspersed to avoid the visibility problems caused by multiple pixels of the input image mapping to the same pixel in the intermediate image during the first stage of the pre-warping. First, the rows in a relief texture may be processed in occlusion-compatible order by starting with the row furthest from the epipole and working towards the epipole. Next, the pixels on each row may be processed in occlusion-compatible order. As the horizontal pre-warp produces each output pixel and displacement, the horizontal pre-warp process outputs the pixel to the vertical pre-warp process for that column. The vertical pre-warp immediately interpolates the pixel into the appropriate column of the output texture. Each vertical pre-warp process receives its pixels in occlusion-compatible order so that correct visibility is preserved in the output. The pseudocode described above for the two-pass pre-warp also applies to the pipelined pre-warp, if the "get" operation in the vertical process for each column waits for the output of the corresponding "put" operation in the horizontal process. The code for the vertical process is identical to the code for the horizontal process except for the last line in the pseudocode. In the vertical process, the registers $I_{prev}$, $C_{prev}$, and $D_{prev}$ hold the values from the previous row until the current row is complete. This is because the horizontal process may map multiple pixels to the same vertical process.

Pipelined Pre-Warped Image Generator

Figure 14A:
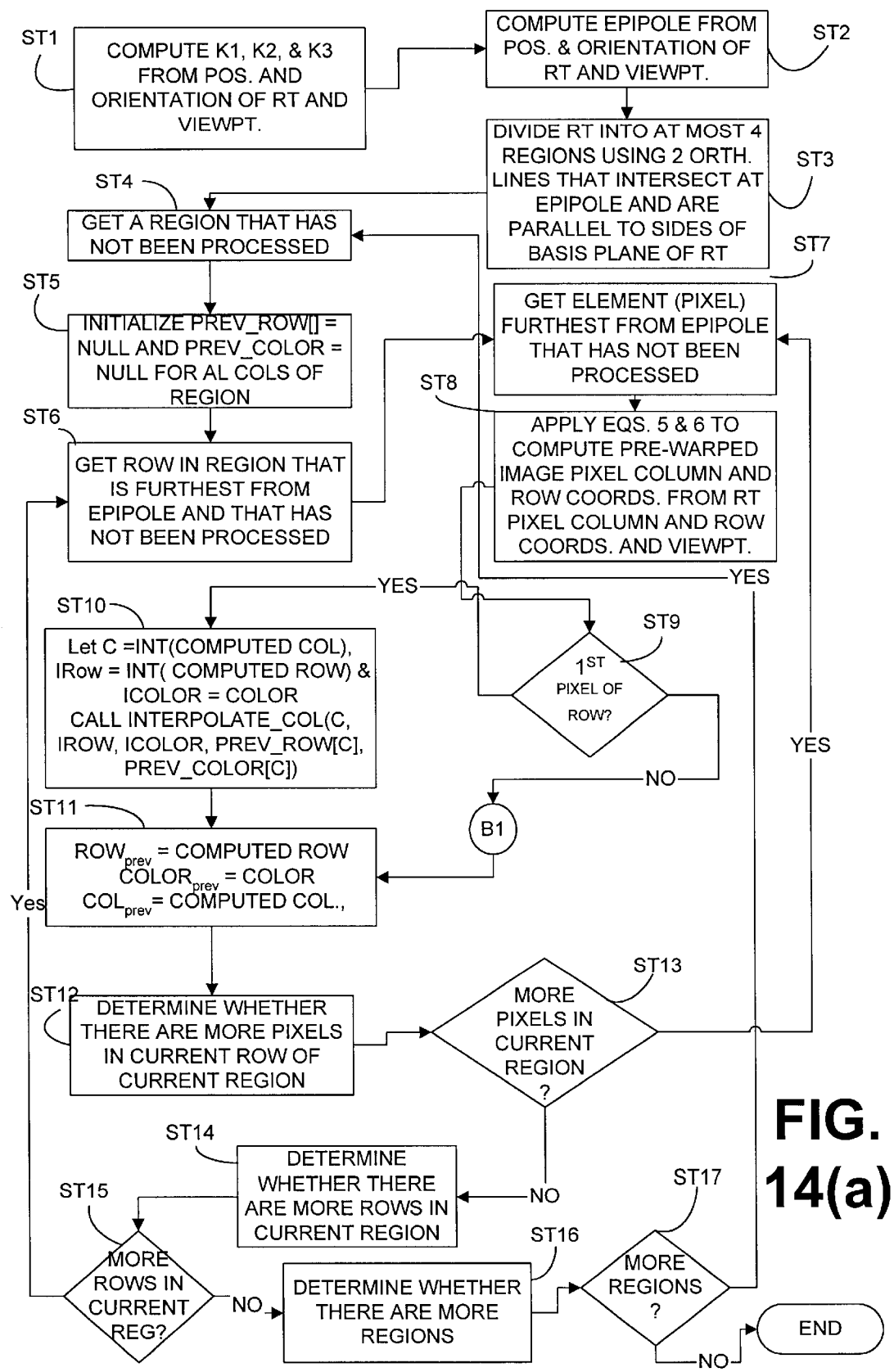
FIGS. 14(a)–14(c) are flow charts illustrating a pipelined pre-warped image generator according to an embodiment of the present invention.
Figure 14B:
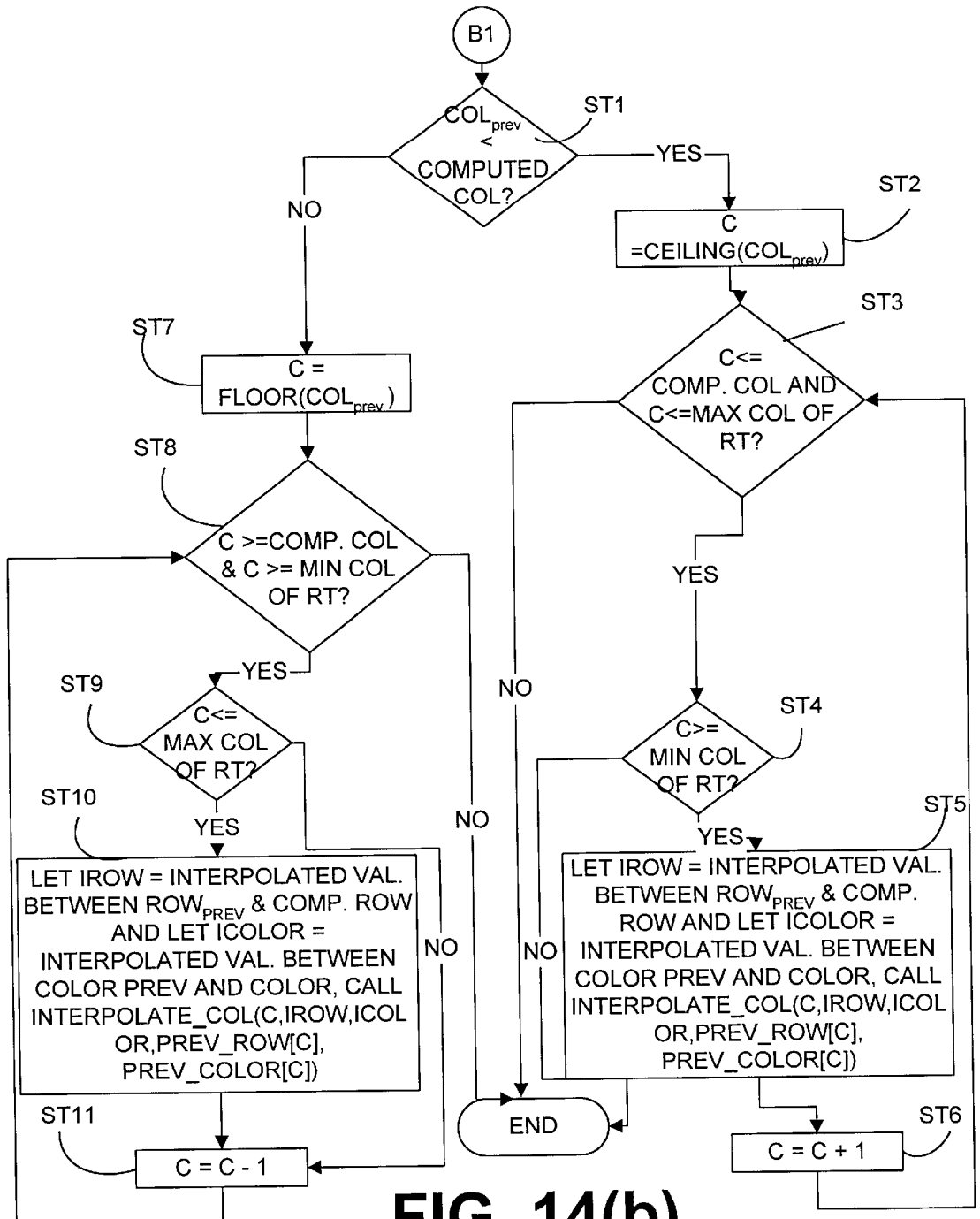
Figure 14C:
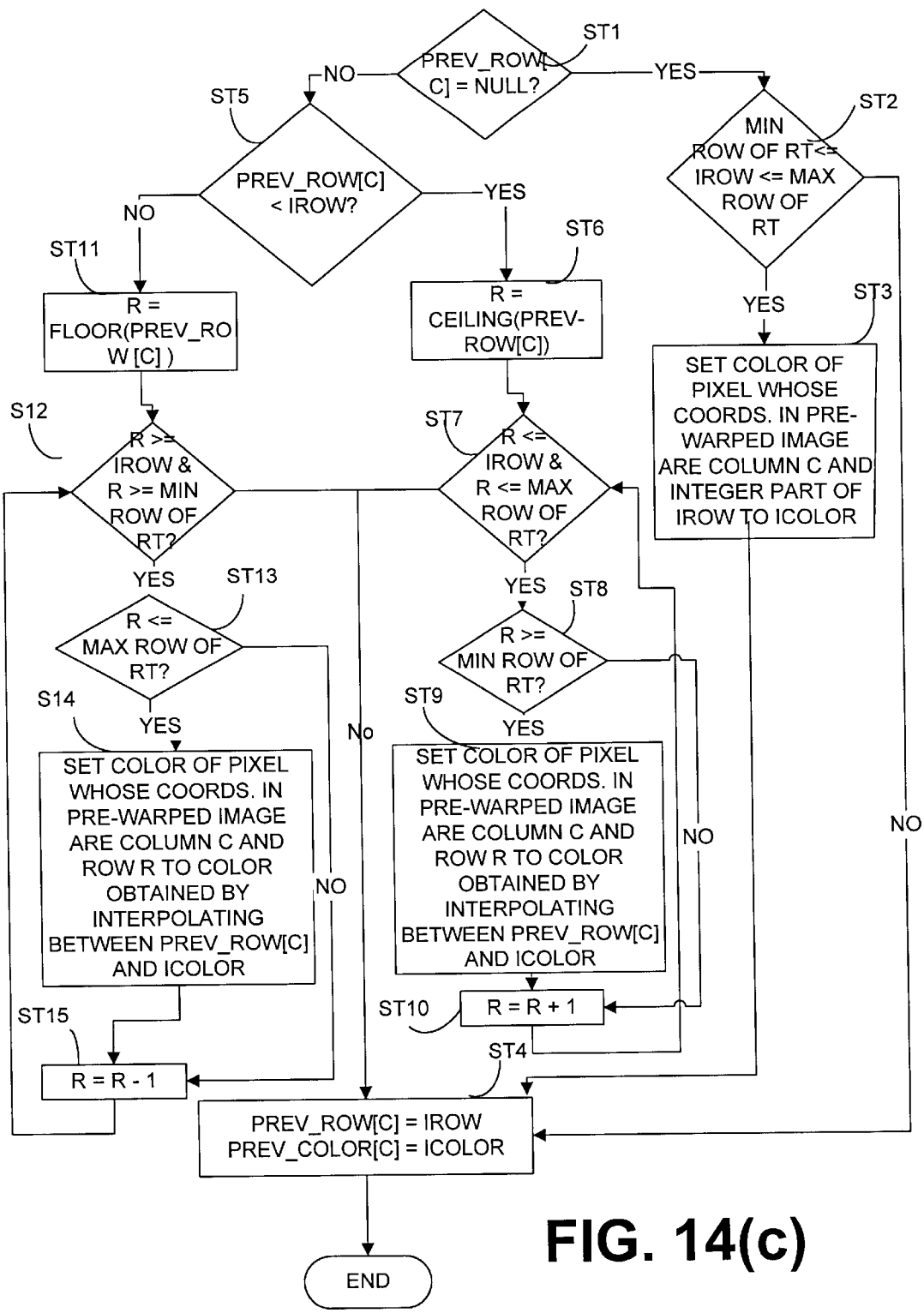

Pipelined pre-warped image generation may be performed utilizing a modified version of the pseudocode described above for the two-pass per-warp method. However, this method may lead to errors in the pre-warped image due to interpolation of displacement values between horizontal and vertical pixel warps. FIGS. 14(a)–14(c) illustrate exemplary steps that may be performed by a pipelined pre-warped image generator according to a preferred embodiment of the present invention. In step ST1 of FIG. 14(a), the pipelined pre-warped image generator computes the constants $k_1$, $k_2$, and $k_3$ to be used in computing pixel row and column coordinates in the pre-warped image from pixel row and column coordinates in the relief texture. In step ST2, the epipole is computed to determine an occlusion compatible order for warping the pixels. In step ST3, the relief texture is divided into no more than four regions according to the location of the epipole. In step ST4, a first region that has not been processed is extracted. Steps ST1–ST4 are thus the same as steps ST1–ST4 performed by the two-pass pre-warped image generator of FIG. 11(a).

In step ST5, the one-dimensional arrays previous_row□ and previous_color□ are initialized to null for all columns of the current region. In step ST6, the row furthest from the epipole that has not been processed is extracted. In step ST7, the pixel in the current row that is furthest from the epipole is extracted. In step ST8, Equations (5) and (6) are applied to compute the pre-warped pixel column and pixel row coordinates from the column and row coordinates of the current pixel and the desired viewpoint.

In step ST9, it is determined whether the current pixel is the first pixel of the row. If the pixel is the first pixel in the row, variable C is set to the integer part of the computed column, variable IRow is set to the integer part of the computed row, variable IColor is set to the color of the current pixel. The control of the program then passes to subroutine InterpolateColumn in FIG. 14(c) that is called with the parameters C, IRow, IColor, previous_row[C] and previous_color[C].

The subroutine illustrated in FIG. 14(c) interpolates each pixel along a column after each pixel is interpolated along a row. Unlike the two-pass case, horizontal and vertical warps are interspersed to avoid occlusion errors. In step ST1 of FIG. 14(c), it is determined whether the value stored in the received parameter previous_row[C] is null. If previous_row[C] is null, then in step ST2 it is determined whether the value stored in the parameter IRow is within the row limits of the relief texture. If the value stored in the parameter IRow is within the row limits of the relief texture, in step ST3 the color of the pixel in the pre-warped image whose column coordinate is given by the value of the parameter C and whose row coordinate is given by the integer part of the value of the parameter IRow is set to the value of the parameter IColor. In step ST4, the values of variables previous_row[C] and previous_color[C] are set to the values of the parameters IRow and IColor, respectively. In the case that the result of the test in step ST1 indicates that previous_row[C] is not null, step ST5 determines whether the value of the parameter previous_row[C] is less than the value of the parameter IRow, indicating that the previous pixel warped to the column may be above the current pixel. If the value of the parameter previous_row[C] is less than the value of the parameter IRow, the value of variable R is set to ceiling(previous_row[C]) in step ST7. In step ST7, it is determined whether R is less than or equal to the value stored in IRow and less to or equal than the maximum row of the relief texture. If the condition in step ST7 is not satisfied, step ST4 is executed and the control return to the point from which the subroutine was called, which may be step ST10 in FIG. 14(a) or steps ST5 and ST10 in FIG. 14(b). If the condition in step ST7 is satisfied, step ST8 test whether R is greater than or equal to the minimum row of the relief texture. If R is greater than or equal to the minimum row of the relief texture, in step ST9 the color of the pixel whose column coordinate is the value of the parameter C and whose row coordinate is R is set to the color obtained by appropriately interpolating the values of the parameters previous-color[C] and IColor. In step ST10 the index variable R is incremented and steps ST7–ST9 are repeated until all holes have been filled. Steps ST11–ST15 proceed in a similar manner to steps ST6–ST10 for the case that the previously computed pixel is below the current computed pixel.

When the control returns from subroutine InterpolateColumn after a call from step ST10 in FIG. 14(a), the variables $row_{prev}$, $color_{prev}$ and $col_{prev}$ are set, in step ST11, to the values of the computed row, the color of the current pixel of the relief texture and the computed column, respectively.

In ST12, it is determined whether more pixels exist in the current row of the current region. If there are more pixels, step ST7 is executed to extract the next pixel from the relief texture. Steps ST8–ST9 are then executed to determine whether the pixel is the first pixel of the row. If the pixel is not the first pixel of the row, control proceeds to FIG. 14(b) through connector B1. In step ST1 of FIG. 14(b), it is determined whether the computed column for the previous pixel is less than the computed column for the current pixel. If the previously computed column is less than the computed column for the current pixel, then the current pixel may be to the right of the previous pixel in the pre-warped image. Thus, it is desirable to determine whether any empty cells exist in the pre-warped image between the previous and current pixels and to fill these holes. Accordingly, in step ST2, a column counter variable C is initialized with ceiling ($col_{prev}$). In step ST3, it is determined whether C is less than or equal to the value of the computed column and less than or equal to the value of the maximum column of the relief texture. If the previous condition is not satisfied, the routine illustrated in FIG. 14(b) ends and control returns to step ST11 in FIG. 14(a). If C is less than or equal to the value of the computed column and less than or equal to the value of the maximum column of the relief texture, then in step ST4 in FIG. 14(b) it is determined whether C is greater than or equal to the minimum column of the relief texture. If C is greater than or equal to the minimum column of the relief texture, then, in step ST5, variable IRow is set to the interpolated value between $row_{prev}$ and computed row, variable IColor is set to the interpolated value between $color_{prev}$ and color, and the subroutine InterpolateColumn is called with the parameters C, IRow, IColor, previous_row[C], previous_color[C]. When control returns from the subroutine InterpolateColumn, the index variable C is incremented in step ST6, after which steps ST3–ST6 are repeated until the test in step ST3 fails and control returns to step ST1 in FIG. 11(a). Steps ST7–ST11 proceed in a similar manner to steps ST2–ST6 for the case that the previously computed pixel is to the left of the current computed pixel.

Once all of the holes between the current and previous pixel in the current row are filled, control proceeds to step ST11 in FIG. 14(a). In step ST14, it is determined whether any rows remain in the current region. If rows remain, the next un-warped row furthest from the epipole is extracted and the pixels in that row are warped horizontally, then vertically, as previously described. If no rows remain in the current region, it is determined whether any regions remain to be warped. (Steps ST16 and ST17) If regions remain, the next region is extracted and processed, as previously described. If no regions remain, the pipelined pre-warped image generator ends. Because the pipelined pre-warped image generator intersperses horizontal and vertical warps of pixels, occlusion errors in the final image are avoided, when compared with the two-pass case.

Mesh-Based Pre-Warped Image Generator

Figure 15:
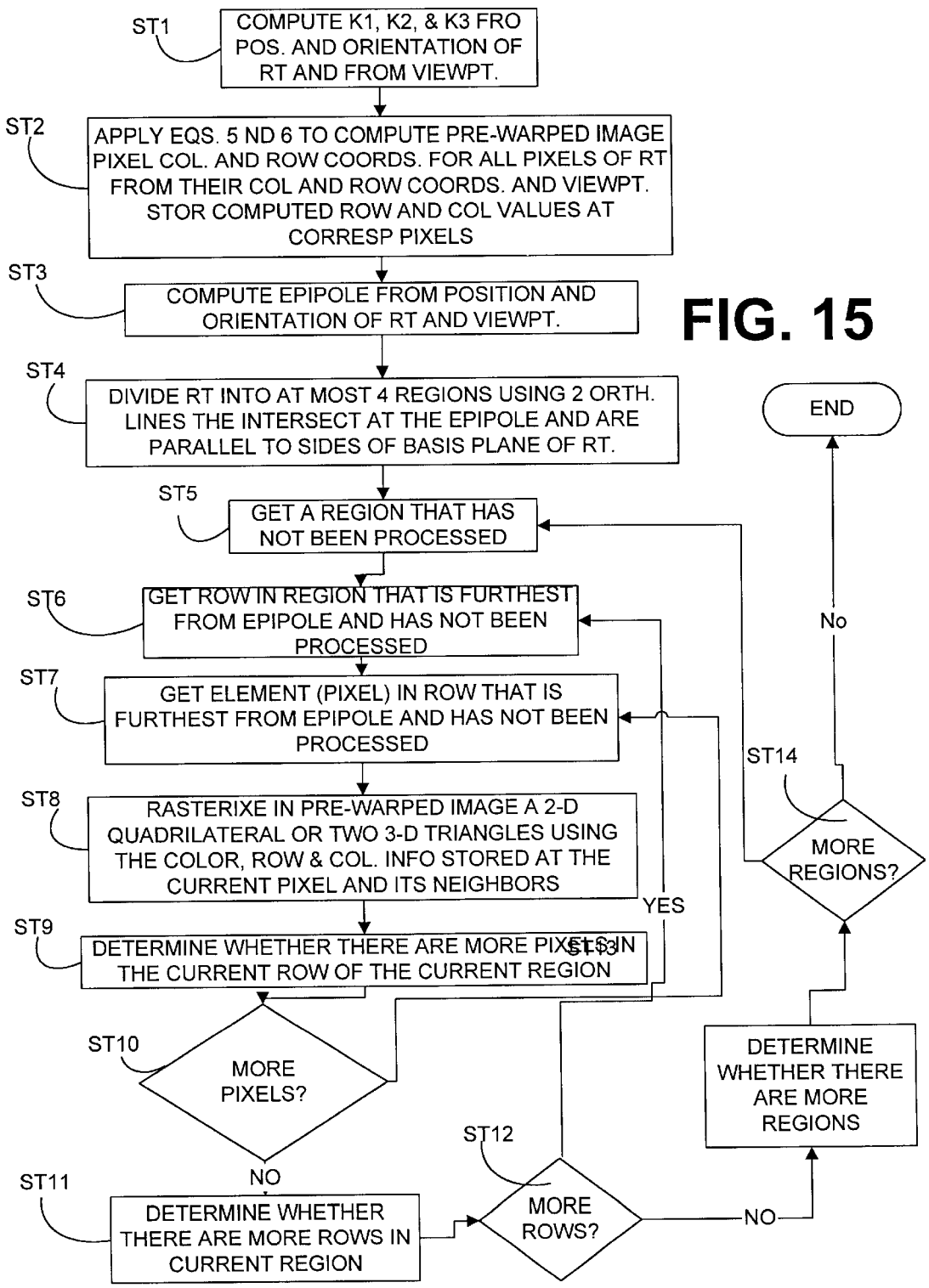
FIG. 15 is a flow chart illustrating a mesh-based pre-warped image generator according to an embodiment of the present invention.

While the horizontal two-pass and pipelined pre-warped image generators described above may result in increased processing speed, each may result in visual artifacts when pre-warping relief textures having relatively large (with respect to the dimensions of the relief texture itself) variations in the length of displacements among neighbor pixels in regions where the associated color texture exhibits complex color patterns. In order to avoid the visual artifacts, a meshed-based pre-warped image generator may be used. FIG. 15 is a flow chart illustrating exemplary steps that may be performed by a mesh-based pre-warped image generator according to an embodiment of the present invention. In step ST1, the constants $k_1$–$k_3$ are computed based on the orientation of the relief texture and the current viewpoint, in the same way used to compute such constants for the other two previous pre-warped image generators. In step ST2, Equations (5) and (6) are applied to compute row and column values for all pixels in the relief texture. The computed row and column values are stored with the corresponding pixels in the relief texture. In steps ST3 and ST4, the epipole is computed and the relief texture is divided into no more than four regions according to the location of the epipole. In step ST5, an unprocessed region is extracted. In step ST6, the unprocessed row in the current region that is furthest from the epipole is extracted. In step ST7, the unprocessed pixel in the current row that is furthest from the epipole is extracted. In step ST8, the mesh-based pre-warped image generator rasterizes a two-dimensional quadrilateral or two two-dimensional triangles in the pre-warped image using color, row, and column information stored at the current pixel and at neighboring pixels in the relief texture. In step ST9, it is determined whether pixels remain in the current row. If pixels remain, steps ST7–ST10 are repeated to extract the next pixel and rasterize a quadrilateral or two triangles in the pre-warped image corresponding to the next pixel. If no pixels remain, it is determined whether any rows remain in the current region. (steps ST11 and ST12) If rows remain, steps ST6–ST10 are repeated to process each remaining row in the region. If all of the rows in the current region have been processed, it is determined whether any regions remain. (steps ST13 and ST14) If any regions remain, steps ST5–ST12 are repeated to extract and process the pixels in the remaining regions. Once all the regions have been processed, the mesh-based pre-warped image generator terminates.

The mesh-based pre-warped image generator does not produce the visual artifacts that may occur if regions of the relief texture exhibit relatively large variations in the length of displacements among neighboring pixels in regions where the associated color texture presents complex color patterns. However, the mesh-based procedure requires more computation than the other approaches because a quadrilateral is rasterized for each pixel in the pre-warped image. Accordingly, in applications that require computational speed and sharp discontinuities that do not exist in the relief textures, the serial two-pass or pipelined approaches may be utilized to generate the pre-warped image. In applications where accuracy is the most important feature, the mesh-based approach may be utilized.

The two-pass pre-warping routine described above has been compared to a pre-warp using mesh-based reconstruction, since the latter is the most common reconstruction method used in computer graphics. The results are almost indistinguishable. The differences are limited to areas in the destination image that are not represented in the source image. For example, interpolation across a depth discontinuity can produce different results for mesh reconstruction than for a two-pass one-dimensional reconstruction. This difference is only noticeable when there is significant change in the texture pattern across the interpolated region. Such artifacts appear to be inherent in serial warps when working across such discontinuities. These differences have not been found to be a significant problem in the models described herein.

Associating a Single Relief Texture With Multiple Surfaces of Varying Size

Often a single texture is used to add detail to multiple surfaces. For example, a brick texture might be used for all the exterior walls of a building. This section explains how relief textures can be used to add detail to multiple surfaces. Let P be a polygonal representation of a scene S. For simplicity, assume the existence of a set of planar rectangular quadrilaterals (quads, for short) $P_q \subseteq P$ that will be texture-mapped with instances of pre-warped relief textures. Transparency (alpha channel equal to zero) is used if the resulting texture is not rectangular.

Each quad in $P_q$ has an associated relief texture, and each relief texture can be associated with an arbitrary number of quads simultaneously.

Figure 16A:
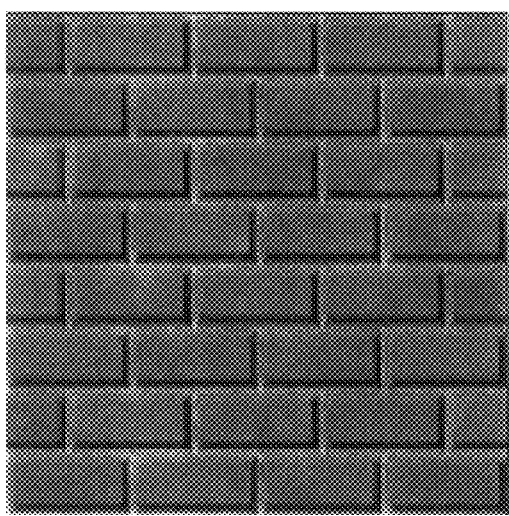
FIG. 16(a) is a texture used to represent a brick wall.
Figure 16B:
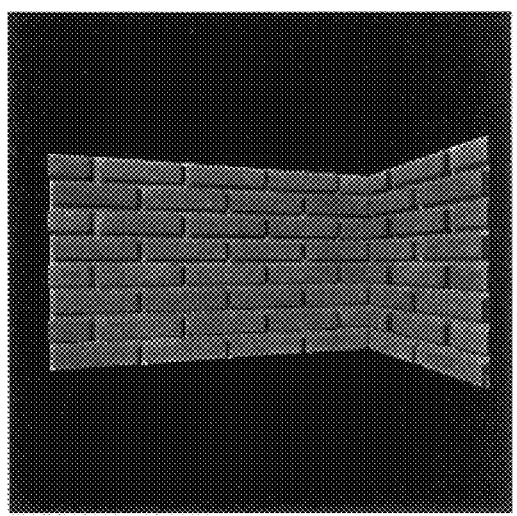
FIG. 16(b) illustrates two instances of the texture illustrated in FIG. 16(a) that are mapped to polygons of different sizes.

Also, each vertex of a quad has an associated pair of texture coordinates (s,t). As the scene model is loaded, for each quad $q_i \epsilon P_q$, a three-dimensional image generation routine according to an embodiment of the present invention computes $\dot{C}_{1i} = v_{1i}$, $\vec{a}_i = (V_{2i} - v_{1i})/(rs_i * c(i))$, $\vec{b}_i = (v_{0i} - v_{i1})/(rt_i * r(i))$, and $\vec{f}_i = \text{normalized}(\vec{a}_i \times \vec{b}_i)$, where $v_{ji}$ is the $j^{th}$ vertex of quad $q_i$, $0 < rs_i < 1$ is the range of the texture parameter s ($rs_i = s(v_{2i}) - s(v_{1i})$), $0 < rt_i \leq 1$ is the range of the texture parameter t ($rt_i = t(v_{0i}) - t(v_{1i})$), and c(i) and r(i) are, respectively, the number of columns and rows of the associated relief texture. $rs_i$ and $rt_i$ are used as scaling factors for the cases in which the whole parameter space for s and t are not used. FIGS. 16(a) and 16(b) illustrate a situation for which the same relief texture is applied to two quads of different dimensions (one of the quads is half as wide as the other one). The scaling by rs =0.5 produces bricks of the same size in the smaller wall, for which the values of parameter s only varies from 0 to 0.5.

At rendering time, the values of $\dot{C}_1$, $\vec{a}$, $\vec{a}$, and $\vec{a}$ of the associated relief texture are replaced with those from quad $q_i$. This has the effect of positioning the height field at the same place and orientation as $q_i$ with respect to the desired viewpoint. The result of the pre-warping operation is an image that when texture-mapped on $q_i$ produces the desired result. The texture coordinates associated with the vertices of $q_i$ are used to select the portion of the image to be applied.

One implementation of utilizing a single relief texture to represent surfaces of different sizes utilizes OpenGL ModelView matrix from the *OpenGL Programming Guide*, by Woo et al, Second Edition, Addison Wesley Developers Press, 1997, to transform $\dot{C}_{1i}$, $\vec{a}_i$, $\vec{b}_i$, and $\vec{f}_i$, which are then used to replace the corresponding values of the associated height field parameter vectors. The transformation matrix is copied. The translational component of the transformation is saved and then zeroed. The resulting rotation matrix is used to multiply the 4×4 matrix $[\dot{C}_{1i}, \vec{a}_i, \vec{b}_i, \vec{f}_i]$ (with the fourth coordinate of all vectors set to 1). The translational component is then added to the transformed value of $\dot{C}_{1i}$.

The technique described is applied to all quads associated with relief textures. By performing the pre-warping operation with vectors associated with the quads, the relief texture is not bound to any particular position or orientation in the scene and can be used with an arbitrary number of quads, producing the desired parallax effect in all cases.

FIG. 16(a) shows a 256×256-pixel original texture used to produce a relief texture for a brick wall. The displacement values of the brick pixels are zero while the mortar pixels have unit displacement. FIG. 16(b) shows the result of applying the same relief texture to two polygons of different sizes.

Representing Complex Shapes

Figure 17:
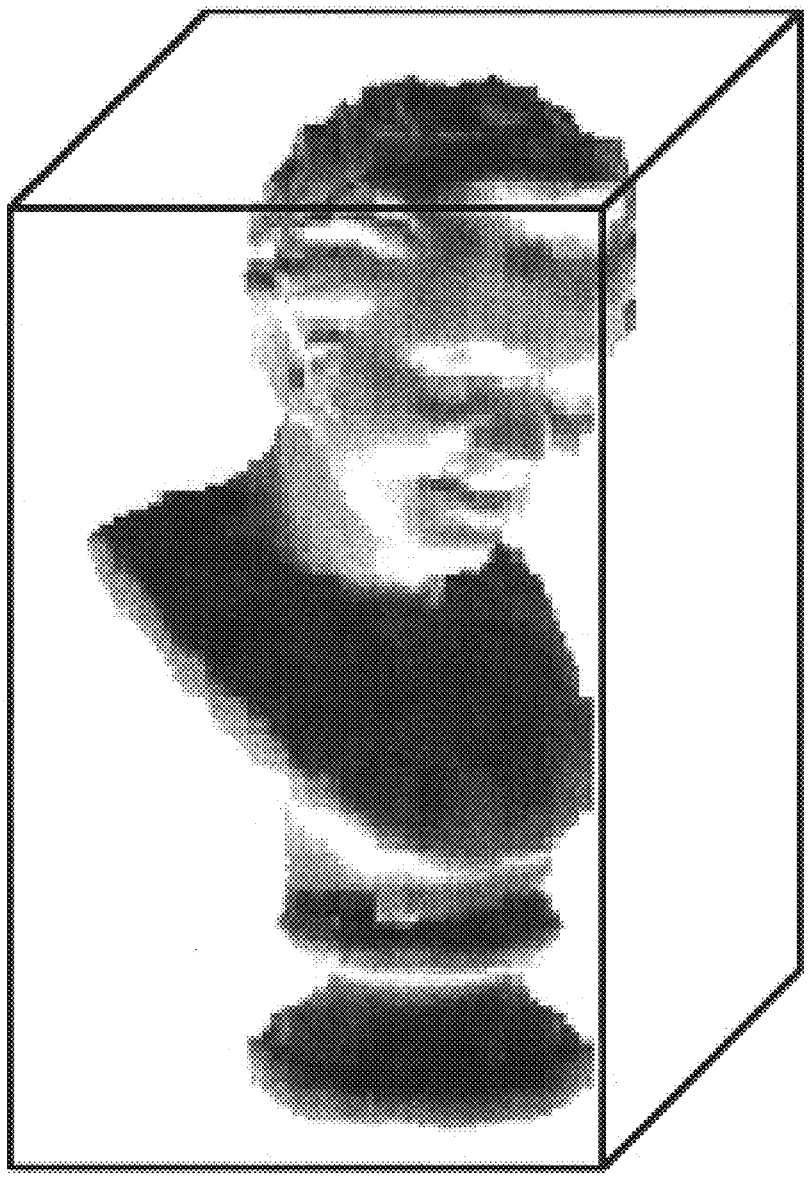
FIG. 17 is a perspective view of an object represented by six relief textures.
Figure 18:
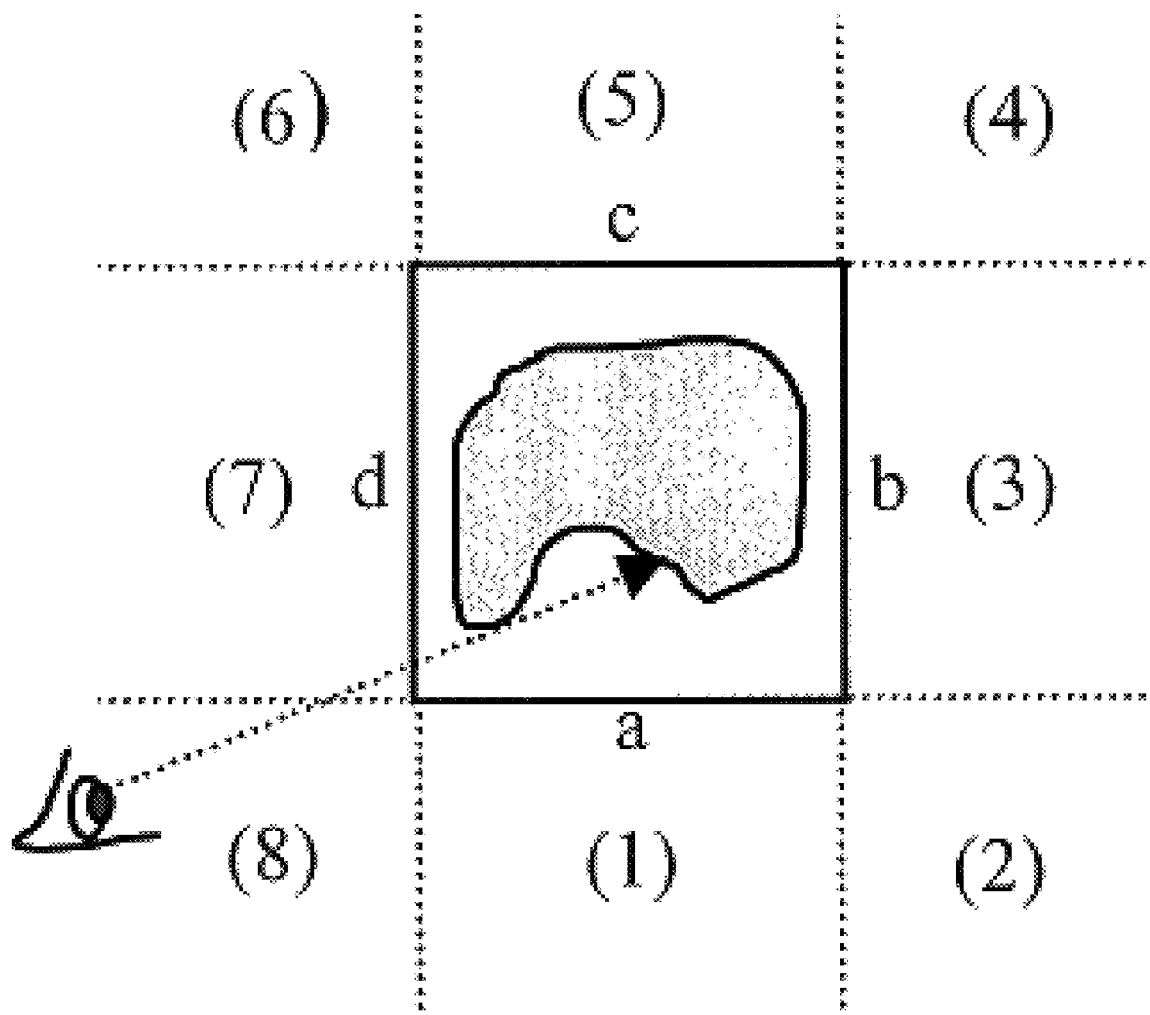
FIG. 18 illustrates region assignment for a top view of an object as depicted in FIG. 17.

According to another aspect of the invention, relief textures may be used to render complex shapes. Several researchers have used image-based approaches to represent complex object shapes. FIG. 17 illustrates an object represented by six relief textures, where each relief texture is the face of a bounding box of the object. The relief textures illustrated in FIG. 17 can be used to produce new views of the object when pre-warped to their own base polygons. Although the relief textures illustrated in FIG. 17 are pre-warped to multiple polygons, since a single viewpoint is used, all images are consistent with each other. However, warping each height field to its own basis polygon is not sufficient to produce the desired result. FIG. 18 illustrates the problem using a top view representation of FIG. 17. Areas sampled only by one face can project onto others, depending on the viewpoint. If such areas are not appropriately mapped to the correct faces, holes will appear. One solution to this problem is to fill the holes by pre-warping neighbor faces to the destination face. The perpendicular relationship between faces allows the use of the same pre-warping functions described by Equations (5) and (6). In FIG. 18, the object space is divided into numbered regions. The concept will be explained in two-dimensions. Its generalization to three-dimensions is straightforward. If the viewer is in an odd region, the three closest faces are classified as front, left, and right with respect to the viewpoint. Thus, for instance, if the viewer is in region (1), face a is front, face d is left, and face b is right. Then, faces left and right are pre-warped to the image plane of front. Then front is pre-warped to its own image plane. If, however, the viewer is an even region, the two closest faces are classified as left and right. For instance, if the viewer is in region (8), face d is left and face a is right, left is pre-warped to the image plane of right, then right is pre-warped to its own image plane. Similarly, right is pre-warped to the image plane of left, and then left is pre-warped to its own image plane. The following pseudocode illustrates the hole-filling algorithm.

Figure 19:
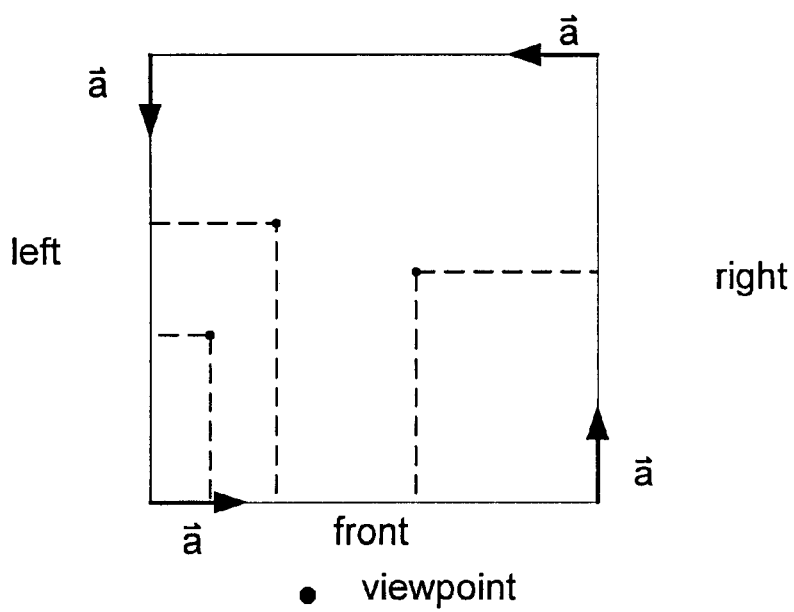
FIG. 19 is a top view of the object illustrated in FIG. 17 showing how displacement values of a relief texture can be interchanged with column values of another relief texture having a basis plane orthogonal to the basis plane of the first relief texture.

If the viewer is in an odd region then
        pre-warp left to fronts image plane;
        pre-warp right to front's image plane;
        pre-warp front to its own image plane;
    Else
        pre-warp left to right's image plane;
        pre-warp right to its own image plane;
        pre-warp right to left's image plane;
        pre-warp left to its own image plane;
    endif This algorithm automatically implements a back-face-culling strategy, since it explicitly defines a set of at most three (in the full three-dimensional version of the algorithm) polygons that need to be displayed. The right-angle relationship between neighboring faces can be exploited to pre-warp a face to its neighbor image plane as if it were the neighboring face itself. When the viewer is in an odd region, the displacement values associated with left and right are converted to column indices for front, while their column indices can be used as displacement for front. FIG. 19 illustrates the conversion of the displacement values from left and right to front. Thus, the left and right relief textures can be pre-warped to the basis plane of the front as if the left and right textures were the front itself. The pre-warping operation for the even region is performed in a similar manner to the pseudocode described above. Thus, the pre-warping equations according to the present invention can be used to produce image of complex objects, such as the statue illustrated in FIG. 17.

According to yet another aspect of the invention, Z buffer values may be modulated during the texture-mapping step to solve for visibility among multiple polygons, some of which may have an associated texture. For example in the image illustrated in FIG. 17, views of the statue are mapped onto faces of a transparent box. If it is desirable to render some other object located inside the box that should be shown in front of the statue, it is necessary to change the Z buffer values of the points on the statue to reflect the perceived depth of each point, rather than the depth of the projection of each point onto the faces of the box. Methods and systems for modulating Z buffer values to reflect the perceived depth of a pre-warped, texture-mapped image are within the scope of the invention.

Experimental Results

Using the algorithms described above, a software test bed for warping relief textures was implemented in C++. The test bed was executed on a 400 MHz Pentium II processor with 128 MB of memory, and an Intergraph Intense three-dimensional Pro 3410-T graphics card. For this application, it is not clear whether the way the texture memory is managed by the graphics card is of any help. Software implementation of the two-step warping process will work best with the new generation of graphics accelerators that store textures in main memory. For example, the Silicon Graphics Incorporated (SGI) O2 and the SGI Visual Workstations for Windows NT integrate the memory and graphics system to allow very high bandwidth access to memory from both CPU and graphics accelerator. Pre-warping the textures on one processor of a multi-processor system, then mapping the texture directly from memory onto polygons should allow very efficient implementation.

Figure 20A:
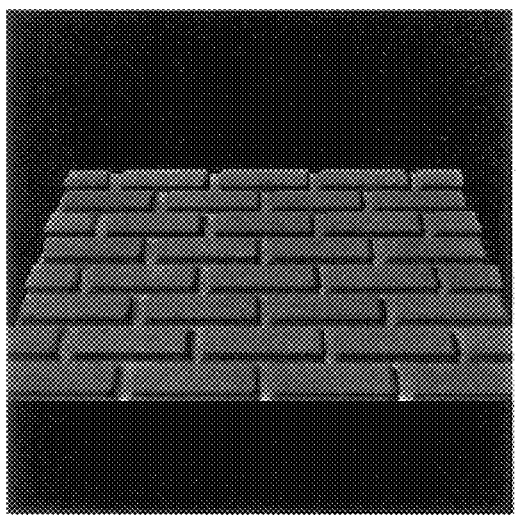
FIG. 20(a) is an oblique view of a brick wall resulting from texture mapping the pre-warped image of the brick wall in FIG. 16(a) to a polygon.
Figure 20B:
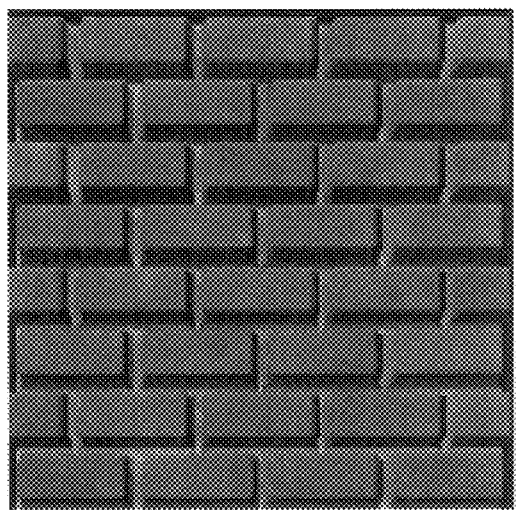
FIG. 20(b) is a pre-warped image representing a texture that is mapped onto the polygon representing a brick wall in FIG. 20(a)

FIG. 20(a) shows an oblique view of a wall modeled as a single polygon and texture-mapped with the corresponding pre-warped relief texture shown in FIG. 20(b). The illusion of three-dimensionality is present, especially at the edges of the wall. The correct parallax effect allows only some of the mortar that is visible in FIG. 20(b) to be visible in FIG. 20(a), because some of the mortar shown in FIG. 20(b) is occluded by bricks in FIG. 20(a).

Figure 21:
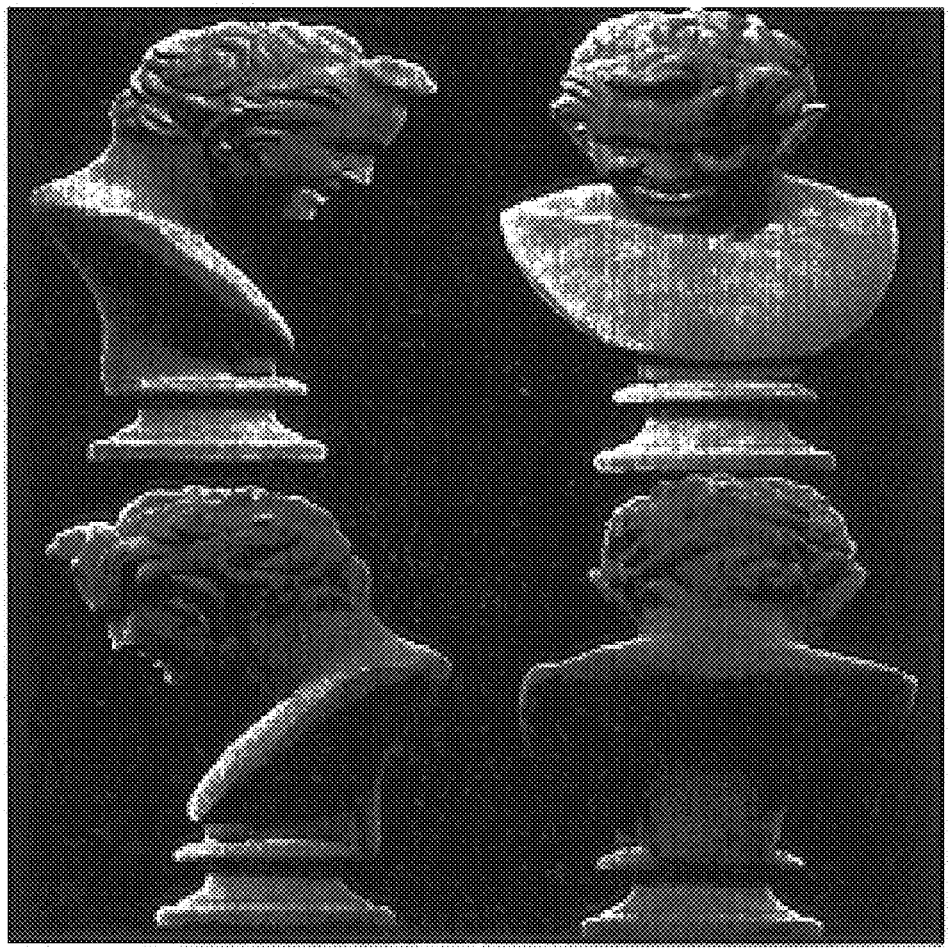
FIG. 21 illustrates a plurality of images of a statue associated with four of the six relief textures used to model the object illustrated in FIG. 17.
Figure 24:
FIG. 24 is a close-up representation of the object illustrated in FIG. 21.

FIG. 21 shows the images associated with four relief textures of a statue originally modeled with 35,280 polygons. Despite the complex shape of the statue, the methods for producing three-dimensional images according to the present invention produce realistic renderings of the object at interactive rates, by using only six relief textures. FIG. 22(a) shows a reconstructed view of the statue obtained by texture mapping two quads (left and right in the pseudocode described above for representing complex shapes). The pre-warped textures corresponding to FIGS. 22(a) and 22(b) are shown in FIGS. 23(a) and 23(b). Such textures were obtained by pre-warping the relief textures associated with the two top images shown in FIG. 21 to both quads whose boundaries are shown in FIG. 22(b). FIGS. 23(a) and 23(b) provide a clear illustration of the factorization of the planar perspective warp from the final images. The pre-warped images illustrated in FIGS. 23(a) and 23(b) appear warped unless they are mapped to quadrilaterals and viewed from the viewpoints illustrated in FIGS. 22(a) and 22(b). FIG. 24 shows a close-up of the statue shown in FIG. 21(a) and 21(b) from a different viewpoint.

Figure 1:
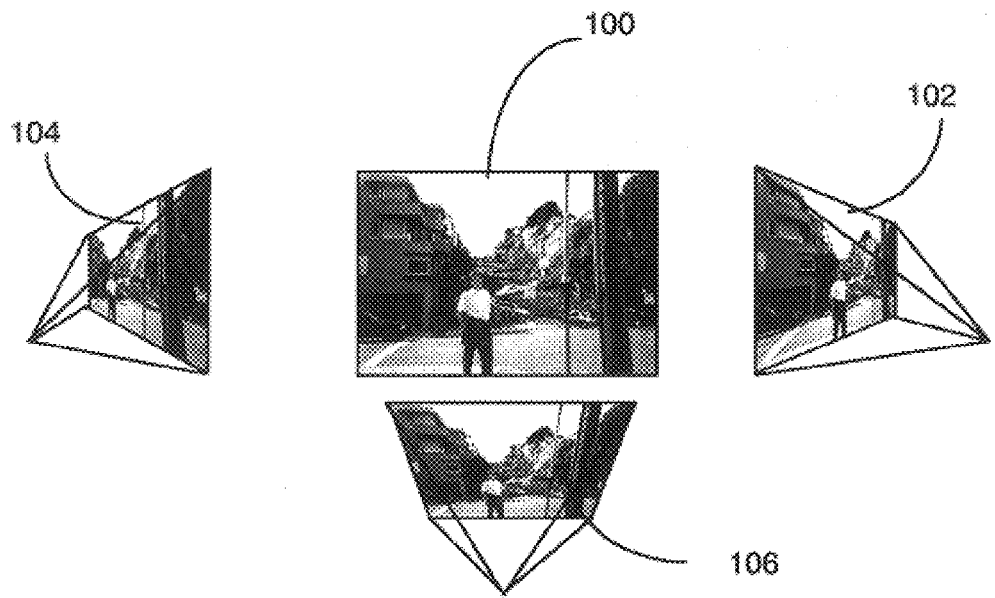
FIG. 1 illustrates computer-generated images of a photograph shown from different viewpoints.
Figure 2:
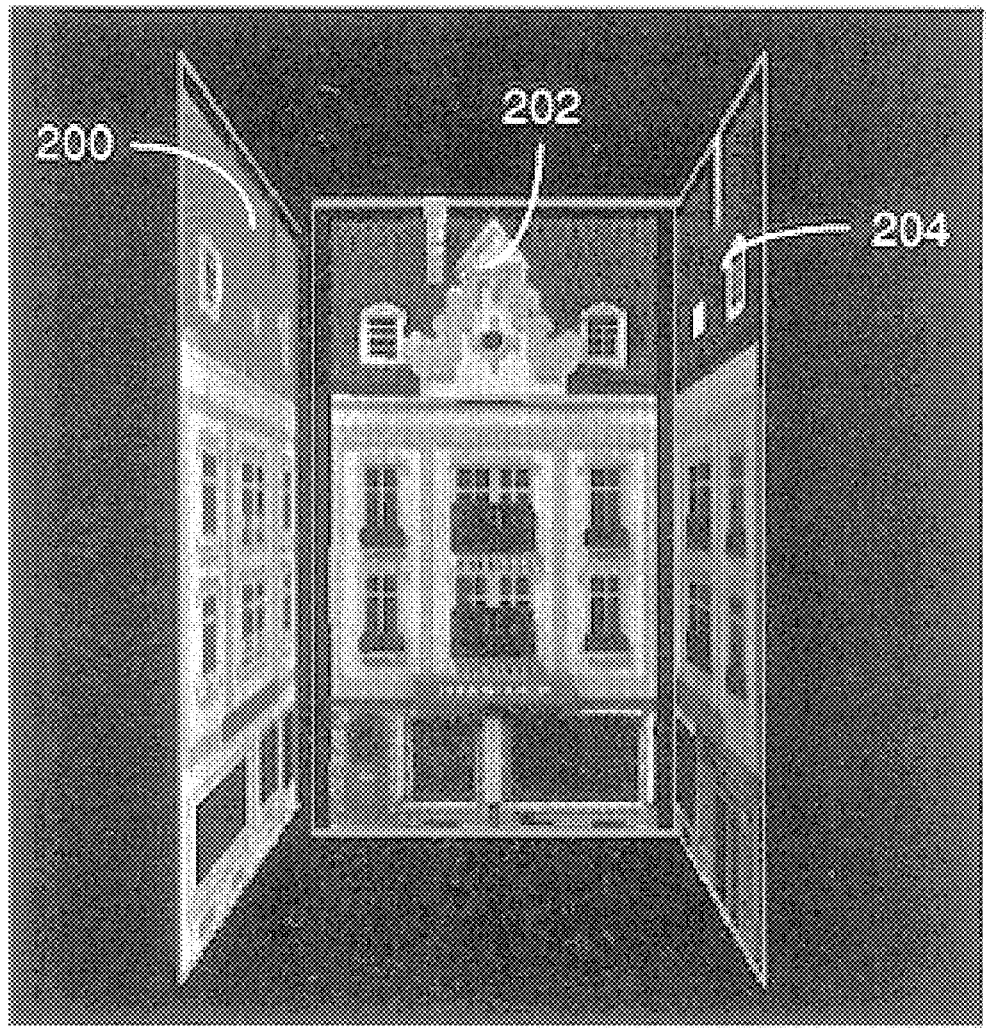
FIG. 2 is a computer-generated image of a scene represented by three polygons using conventional texture mapping.
Figure 3:
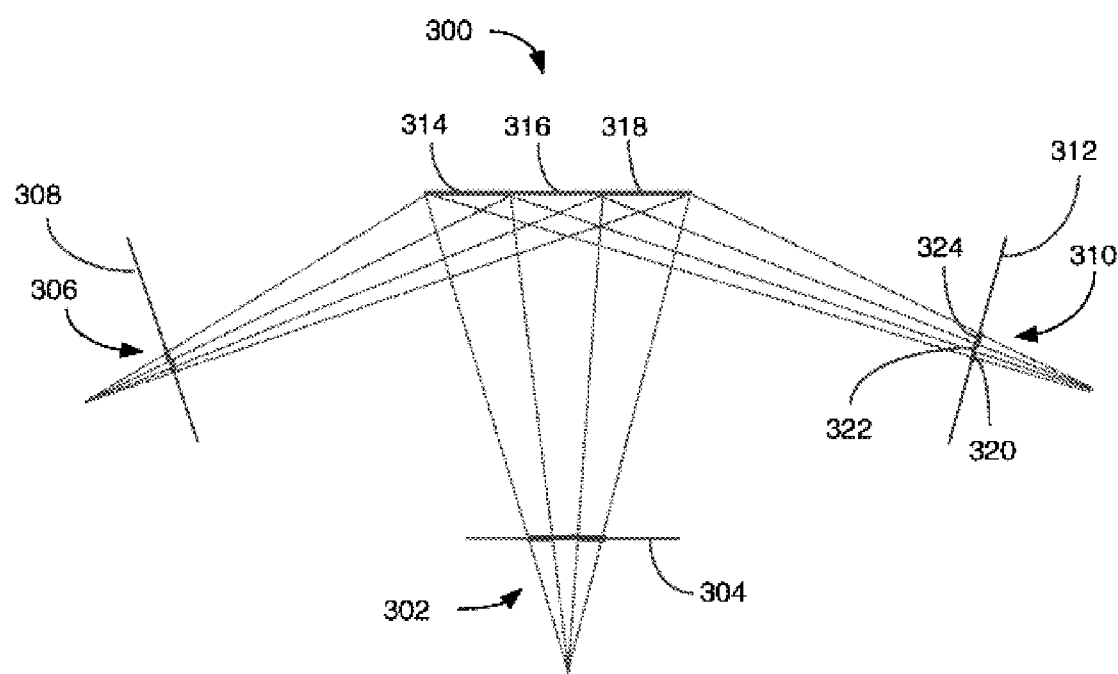
FIG. 3 is a computer-generated image illustrating conventional texture mapping in one dimension.
Figure 4:
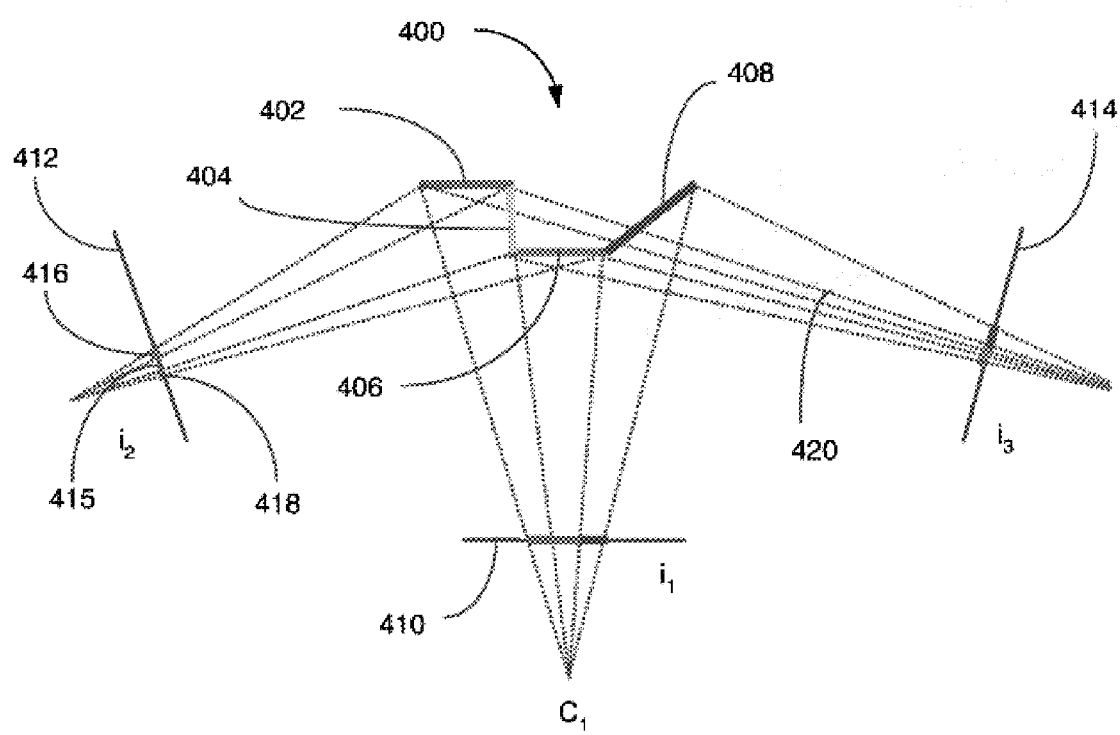
FIG. 4 is a computer-generated image illustrating conventional three-dimensional image warping.
Figure 25:
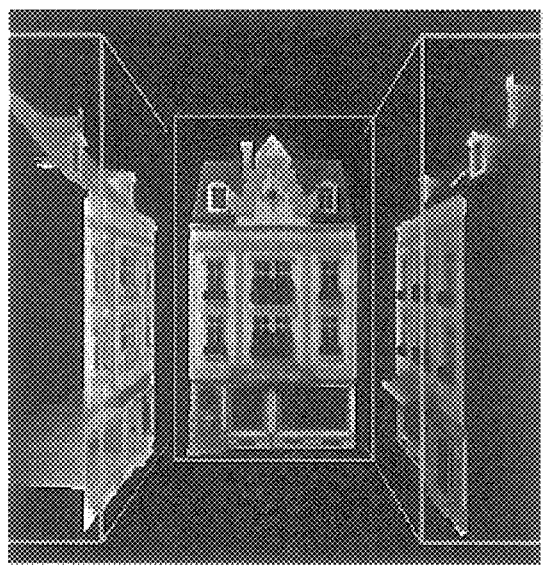
FIG. 25 is an image of a scene rendered using three relief textures and five polygons.
Figure 26:
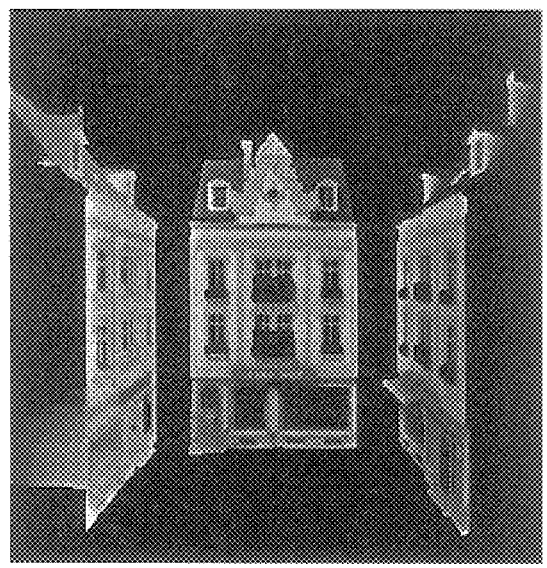
FIG. 26 is an image of the scene illustrated in FIG. 25 without the boundaries of the polygons.
Figure 27:
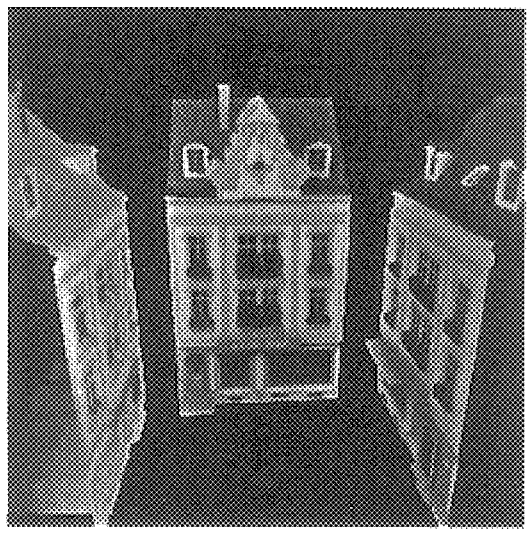
FIG. 27 is an image of the scene illustrated in FIG. 26 shown from a different viewpoint.
Figure 28:
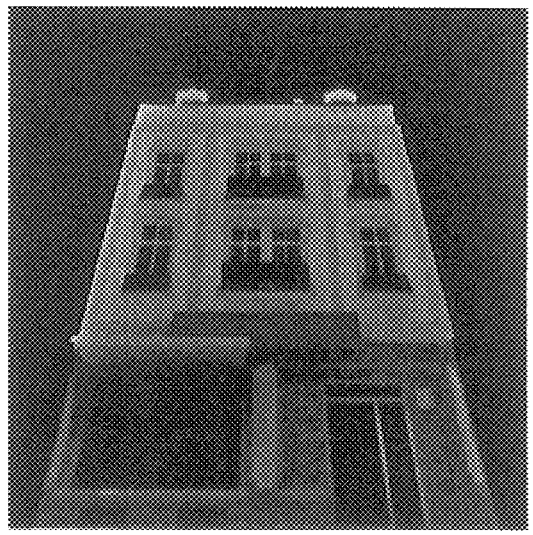
FIG. 28 is a pre-warped image mapped to a polygon according to an embodiment of the present invention.

FIGS. 2 and 25–27 compare the use of conventional texture mapping and the three-dimensional image generation routines of the present invention. FIG. 2 shows the results of conventionally texture mapping three quads whose borders are shown in red. The result looks unrealistic. FIG. 25 shows the same scene rendered using three relief textures and five rectangles. The extra quadrilaterals were used to accommodate the samples that map beyond the borders of the three original quadrilaterals. The mappings for the additional quadrilaterals were generated by pre-warping the relief textures to the additional planes, taking advantage of their perpendicularity. FIG. 26 shows the same scene without the borders of the quadrilaterals. Notice the perception of three-dimensionality. FIG. 27 illustrates the scene of FIG. 26 from a different viewpoint. FIG. 28 shows an image of a building rendered using one relief texture and a single polygon, and reconstructed with the two-pass one-dimensional reconstruction algorithm.

Limitations

Several of the tradeoffs and limitations involving the use of texture-mapped flat polygons to represent complex geometric shapes also apply to he relief texture mapping techniques of the present invention. The viewer must not pass through the textured polygon. Putting the planes as close to the represented objects as possible minimizes this problem. Alternatively, one can switch to geometry when such a situation is reached. A limitation inherent to pre-warping a relief texture to its own basis polygon is the fact that some samples can be mapped beyond the limits of the image plane. One solution to this problem is to use an extra plane perpendicular to the original one to accommodate the "overflows". FIG. 25 illustrates the results of additional perpendiculars to accommodate the overflows. Ideally, all samples at the borders of the relief texture should have zero displacement. This way, height fields can be safely tiled as regular textures with image continuity assured.

Applications

Relief textures can be used in a modeling system to represent surfaces and objects. Users might be given controls that allow generation of a course geometric model and then to push and pull on the surfaces adding displacements to the underlying geometry.

Flight simulators and other applications that display terrain grids might use relief textures to represent the ground. Other applications that display terrain grids would benefit as well.

Images acquired by a variety of measurement systems including scanning-tunneling microscopes and atomicforce microscopes are naturally height fields (height is a single-valued function of x and y coordinates). This kind of data can be well represented by relief textures.

Relief textures can be used to replace thousands of polygons representing geometric detail in a model with a single or multiple relief textures. This is particularly relevant when the geometric detail being replaced is small relative to the size of the object. In this case replacing the detail with one or more relief texture will generate few, if any, artifacts. The images of buildings described above illustrate this case.

Relief textures can be used as one level in a multiple "level-of-detail" model for rendering acceleration. When the object is far away, the displacements could be ignored and the texture could be used in the conventional way. As the viewpoint moves closer, the relief texture could be used as described herein. As the viewpoint gets closer yet, the system might directly render the primitive using a pair of triangles or a single quadrilateral for each sample in the relief texture.

Relief textures can be used to simplify very complex models by enclosing the viewpoint in a box and representing all of the geometry outside the box with projective relief textures mapped onto the surfaces of the box.

Relief textures can be used in video games to produce "sprites" (objects and characters that are represented with small images) that appear three-dimensional. Cycling through several different relief-textures for the same sprite will enable animation of the character or object.

Future Work

One important area for investigation is the design of efficient hardware implementations for relief textures using the pre-warping functions of the present invention. Adding this pre-warping capability to the texture memory of a graphics accelerator may allow relief textures to become as commonly used as conventional textures. Other avenues for exploration involve the use of a mip-map representation for pre-filtering, the use of relief textures for geometry simplification, and the use of normal maps for view-dependent lighting of relief textures.

Hardware Implementation

As stated above, the three-dimensional image generation techniques according to the present invention may be embodied in hardware, software, or a combination of hardware and software. In a preferred embodiment, the pre-warped image generation routines, for example, as illustrated in FIGS. 11(a)–11(c), FIGS. 14(a)–14(c), and/or FIG. 15 may be embodied in a computer chip mountable to a computer graphics card, such as a graphics card insertable into a personal computer. The texture mapping routines for mapping the pre-warped image to a polygon may be included on the same chip as the pre-warped image generation routines or on a separate chip from the chip containing the pre-warped image generation routines. Implementing some or all of the pre-warped image generation routines in hardware may increase the speed at which three-dimensional images are generated.

Perspective Projection Image as Source Image for Pre-Warp

As stated above with respect to Equations (5) and (6), the source image for the pre-warping operation may be a parallel projection image. However, the present invention is not limited to using a parallel projection image as the source image for the pre-warping operation. For example, the source image for the pre-warping operation may be a perspective projection image, and the pre-warping operation may be performed using two one-dimensional equations, similar in structure to Equations (5) and (6), provided that the source and pre-warped image planes are parallel to each other.

Figure 29:
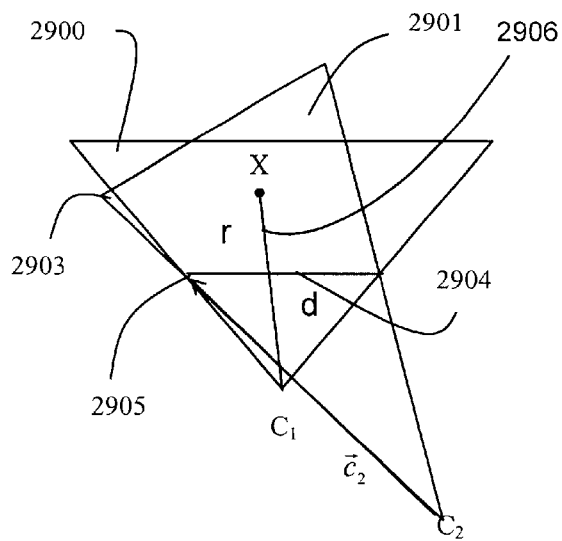
FIG. 29 is diagram illustrating source and pre-warped image viewing frusta wherein the origin of the pre-warped image plane does not correspond to the center of projection of the source image.

In one example where the source of the pre-warping operation is a perspective projection image, the origin of the pre-warping image plane may not correspond with the center of projection of the source image. FIG. 29 illustrates this case. In FIG. 29, $C_1$ is the center of projection of the source image and $C_2$ is the center of projection of the pre-warped image. A shaded area 2900 represents the viewing frustum of the source image. An un-shaded triangle 2901 represents the viewing frustum of the pre-warped image. A region 2903 represents the area from the pre-warped image viewing frustum not covered by the source image viewing frustum.

A horizontal line 2904 represents the image planes of both the source image and the pre-warped image. A point 2905 represents the origin of both the source and pre-warped image planes. In the illustrated example, the origin of the pre-warped image plane does not correspond to the center of projection of the source image plane.

For the configuration shown in FIG. 29, the pre-warping equations become:

$$u_2 = \frac{u_1 + q_1 + q_2 \delta(u_1, v_1)}{q_5 + q_6 \delta(u_1, v_1)} \quad (5a)$$

$$v_2 = \frac{v_1 + q_3 + q_4 \delta(u_1, v_1)}{q_5 + q_6 \delta(u_1, v_1)} \quad (6a)$$

where $q_i$, i=1 ... 6, are constants for each desired viewpoint defined as $$q_1 = \frac{\vec{c_1} \cdot (\vec{b} \times \vec{c_2})}{\vec{a} \cdot (\vec{b} \times \vec{c_2})}, \quad q_2 = \frac{(\vec{C_1} - \vec{C_2}) \cdot (\vec{b} \times \vec{c_2})}{\vec{a} \cdot (\vec{b} \times \vec{c_2})}, \quad q_3 = \frac{\vec{c_1} \cdot (\vec{c_2} \times \vec{a})}{\vec{a} \cdot (\vec{b} \times \vec{c_2})},$$

$$q_4 = \frac{(\vec{C_1} - \vec{C_2}) \cdot (\vec{c_2} \times \vec{a})}{\vec{a} \cdot (\vec{b} \times \vec{c_2})}, \quad q_5 = \frac{\vec{c_1} \cdot (\vec{a} \times \vec{b})}{\vec{a} \cdot (\vec{b} \times \vec{c_2})} \text{ and}$$

$$q_6 = \frac{(\vec{C_1} - \vec{C_2}) \cdot (\vec{a} \times \vec{b})}{\vec{a} \cdot (\vec{b} \times \vec{c_2})}.$$

In Equations (5a) and (6b), $\delta(u_1, v_1)$ is the generalized disparity of the pixel with coordinates $(u_1, v_1)$. As used herein, the generalized disparity refers to the ratio of a distance d shown in FIG. 29 between the center of projection $C_1$ and the source image plane 2904 along a projection 2906 and the range r. The range r is the distance from the point X and the center of projection $C_1$ along the projection 2906. Thus, Equations (5a) and (6a) illustrate that one-dimensional pre-warping equations may be utilized when the source image is a perspective projection image and the center of projection of the source image does not correspond with the origin of the pre-warped image plane.

Figure 30:
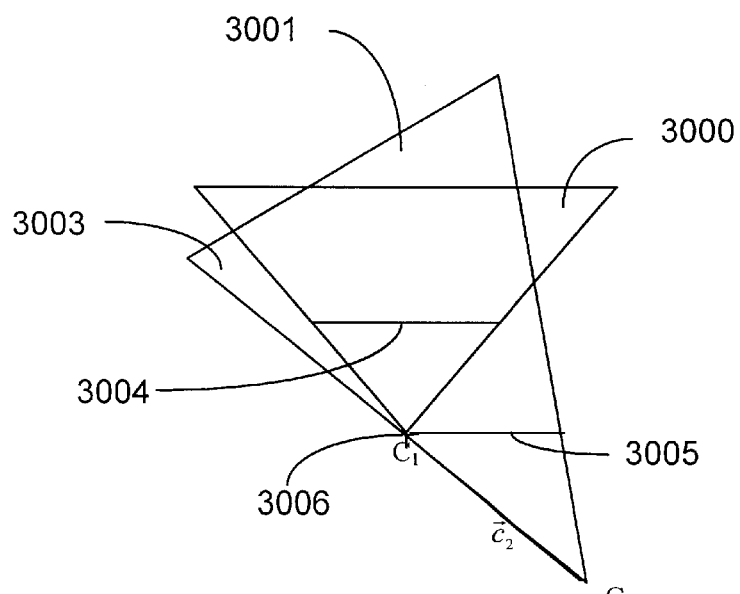
FIG. 30 is diagram illustrating source and pre-warped image viewing frusta wherein the origin of the pre-warped image plane corresponds to the center of projection of the source image.

In another example in which the source image of the pre-warping operation is a perspective projection image, the origin of the pre-warped image plane coincides with the center of projection of the source image. FIG. 30 illustrates this configuration. In FIG. 30, $C_1$ and $C_2$ are the centers of projection of the source and pre-warped image planes. Shaded triangle 3000 is the viewing frustum for the source image, and un-shaded triangle 3001 is the viewing frustum for the pre-warped image. Region 3003 is a region of the pre-warped viewing frustum 3001 that does not appear in the source image viewing frustum 3000.

Horizontal line 3004 is the source image plane. Horizontal line 3005 is the pre-warped image plane. In the illustrated example, the source image plane 3004 is parallel to the pre-warped image plane 3005. Point 3006 is the origin of the pre-warped image plane 3005. The origin 3006 of the pre-warped image plane 3005 thus corresponds to the center of projection $C_{12}$ of the source image. For the configuration shown in FIG. 30, $C_2$ is constrained to be behind $C_1$. The pre-warping equations become:

$$u_2 = \frac{u_1 + r_1}{r_3 + \delta(u_1, v_1)} \quad (5b)$$

$$v_2 = \frac{v_1 + r_2}{r_3 + \delta(u_1, v_1)} \quad (6b)$$

where $r_i$, i=1 . . . 3, are constants for each view and are defined as $$r_1 = \frac{\vec{c}_1 \cdot (\vec{b} \times \vec{c}_2)}{\vec{a} \cdot (\vec{b} \times \vec{c}_2)},$$

$$r_2 = \frac{\vec{c}_1 \cdot (\vec{c}_2 \times \vec{a})}{\vec{a} \cdot (\vec{b} \times \vec{c}_2)} \text{ and}$$

$$r_3 = \frac{\vec{c}_1 \cdot (\vec{a} \times \vec{b})}{\vec{a} \cdot (\vec{b} \times \vec{c}_2)}.$$

In Equations (5b) and (6b), $\delta(u_1,v_1)$ is the generalized disparity of the pixel with coordinates $(u_1,v_1)$.

In the configurations illustrated in FIGS. 29 and 30 the pre-warped image plane can always be made large enough so that the original view frustum is completely inside the new one, and there is no need to account for situations in which samples map beyond the limits of the pre-warping image plane.

As stated above the pre-warping equations according to the present invention can be used to simplify very complex models by enclosing the viewpoint in a box and representing all of the geometry outside the box with perspective projection source images that can be pre-warped and mapped onto the surfaces of the box.

In FIG. 31, six inside-looking outside perspective projection images with depth covering the whole field of view may be acquired from the interior of a cube. The centers of projection of such images do not need to be coincident.

FIGS. 32(a)–32(c) depict situations showing desired viewpoints inside the cube. Faces that are at least partially visible from the desired viewpoint are called active faces. In FIGS. 32(a)–32(c), shaded regions 3200–3204 represent view frusta associated with the active faces. For such a configuration, all epipoles are negative (the desired COP is behind all source image-planes). Dashed lines 3205–3207 represent desired fields of view for each image. Thus, an occlusion compatible order consists in visiting samples from the epipoles towards the borders of the images. Pre-warping equations (5a) and (6a) can be used to pre-warp source images associated with active faces that are then texture-mapped to the corresponding faces of the cube, producing perspectively correct views of the scene for the desired viewpoint. An exemplary algorithm for rendering complex scenes from the inside of a cube looking out can be stated as:

For each $f_i$ in active faces do

Pre-warp $f_i$ to its own image plane using Equations (5a) and (6a)

Texture map the resulting image to a quadrilateral that matches the dimensions, position and orientation of $f_i$ in 3-space.

Thus, perspective projection source images can be used in conjunction with one-dimensional pre-warping equations to generate three-dimensional images of complex scenes utilizing an inside looking out approach.

It will be understood that various details of the invention may be changed without departing from the scope of the invention. Furthermore, the foregoing description is for the purpose of illustration only, and not for the purpose of limitation—the invention being defined by the claims.

What is claimed is:

1. A mesh-based pre-warped image generator comprising computer-executable instructions embodied in a computer-readable medium for performing steps comprising:

(a) computing pixel row and column values in a pre-warped image for all pixels in a relief texture utilizing first and second one-dimensional pre-warping equations;

(b) storing the computed pixel row and column values and pixel color values in an intermediate array of pixels;

(c) extracting a first pixel from the intermediate array of pixel;

(d) rasterizing a polygon in the pre-warped image based on row, column, and color values stored for the first pixel in the intermediate array of pixels, and row, column, and color values stored in the intermediate image for pixels near the first pixel;

(e) determining a location for an epipole for the relief texture based on a desired viewpoint;

(f) dividing the relief texture into no more than four regions based on the location of the epipole; and (g) dividing each region into at least one row and at least one column, wherein extracting a pixel from the relief texture includes extracting pixels in an occlusion-compatible order along each row or column in each region.

2. The mesh-based pre-warped image generator of claim 1 wherein rasterizing a polygon in the pre-warped image comprises rasterizing a quadrilateral in the pre-warped image.

3. The mesh-based pre-warped image generator of claim 2 wherein rasterizing a polygon in the pre-warped image comprises rasterizing first and second triangles in the pre-warped image.

4. The mesh-based pre-warped image generator of claim 1 wherein extracting pixels in an occlusion-compatible order comprises extracting pixels in each row or column in an order from a pixel furthest from the epipole to a pixel nearest to the epipole.

5. The mesh-based pre-warped image generator of claim 1 comprising comparing Z buffer values of pixels in the relief texture to determine proper occlusion relationships of pixels in the pre-warped image.

6. The mesh-based pre-warped image generator of claim 1 wherein the first one-dimensional pre-warping equation calculates a pixel column coordinate $u_2$ is the pre-warped image, wherein $$u_2 = \frac{u_1 + k_1 displ(u_1, v_1)}{1 + k_3 displ(u_1, v_1)}$$

and $u_1$ is a column coordinate of a pixel in the relief texture, $k_1$ and $k_3$ are constants, and $displ(u_1,v_1)$ is the displacement for the pixel in the relief and the second one-dimensional pre-warping equation calculates a pixel row coordinate $v_2$ in the pre-warped image, wherein $$v_2 = \frac{v_1 + k_2 displ(u_1, v_1)}{1 + k_3 displ(u_1, v_1)}$$

and $v_1$ is a row coordinate of the pixel in the relief texture, $k_2$ and $k_3$ are constants, and $displ(u_1,v_1)$ is the displacement for the pixel in the relief texture.

7. The mesh-based pre-warped image generator of claim 6 comprising comparing Z buffer values of pixels in the relief texture to determine proper occlusion relationships of pixels in the pre-warped image.

8. The mesh-based pre-warped image generator of claim 1 wherein the computer-executable instructions are embodied in a computer chip mountable to a graphics card.

9. A method for three-dimensional image warping comprising:
(a) pre-warping pixels from a perspective projection source image to a pre-warped image plane corresponding to or parallel to an image plane of the perspective projection source imaging using first and second one-dimensional pre-warping equations to produce a pre-warped image; and
(b) texture mapping the pre-warped image to a polygon used to model a scene, wherein the perspective projection source image includes a center of projection and the pre-warped image plane includes an origin that does not correspond to the center of projection of the perspective projection source image.

10. The method of claim 9 wherein the first one-dimensional pre-warping equation calculates column coordinate $u_2$ for a pixel in the pre-warped image and the second one-dimensional pre-warping equation calculates a row coordinate $v_2$ for the pixel in the pre-warped image, wherein $$u_2 = \frac{u_1 + q_1 + q_2\delta(u_1, v_1)}{q_5 + q_6\delta(u_1, v_1)}$$

$$v_2 = \frac{v_1 + q_3 + q_4\delta(u_1, v_1)}{q_5 + q_6\delta(u_1, v_1)}$$

and $q_i$, i being an integer ranging from one to six, are constants for each desired viewpoint and $\delta(u_1,v_1)$ is the generalized disparity of the pixel defined by coordinates $(u_1,v_1)$.

11. A method for three-dimensional image warping comprising:
(a) pre-warping pixels from a perspective projection source image to a pre-warped image plane corresponding to or parallel to an image plane of the perspective projection source imaging using first and second one-dimensional pre-warping equations to produce a pre-warped image; and
(b) texture mapping the pre-warped image to a polygon used to model a scene, wherein the perspective projection source image includes a center of projection and the pre-warped image plane includes an origin that corresponds to the center of projection of the perspective projection source image.

12. The method of claim 11 wherein the first one-dimensional pre-warping equation calculates a column coordinate $u_2$ for a pixel in the pre-warped image and the second one-dimensional pre-warping equation calculates a row coordinate $v_2$ for the pixel in the pre-warped image, wherein $$u_2 = \frac{u_1 + r_1}{r_3 + \delta(u_1, v_1)}$$

$$v_2 = \frac{v_1 + r_2}{r_3 + \delta(u_1, v_1)}$$

and $r_i$, i being an integer ranging from one to three, are constants for each view and $\delta(u_1,v_1)$ is the generalized disparity of the pixel defined by coordinates $(u_1,v_1)$.

* * * * *